(12) United States Patent
Lukas et al.

(10) Patent No.: US 10,840,157 B2
(45) Date of Patent: Nov. 17, 2020

(54) METHODS FOR REDUCING CHIP TESTING TIME USING TRANS-THRESHOLD CORRELATIONS

(71) Applicant: University of Virginia Patent Foundation, Charlottesville, VA (US)

(72) Inventors: Christopher J. Lukas, Charlottesville, VA (US); Benton H. Calhoun, Charlottesville, VA (US); Farah B. Yahya, Charlottesville, VA (US)

(73) Assignee: University of Viriginia Patent Foundation, Charlottesville, VA (US)

( * ) Notice: Subject to any disclaimer, the term of this patent is extended or adjusted under 35 U.S.C. 154(b) by 151 days.

(21) Appl. No.: 15/997,652

(22) Filed: Jun. 4, 2018

(65) Prior Publication Data

US 2019/0074229 A1    Mar. 7, 2019

Related U.S. Application Data

(60) Provisional application No. 62/514,087, filed on Jun. 2, 2017.

(51) Int. Cl.
*H01L 21/66* (2006.01)
*G06F 17/15* (2006.01)
(Continued)

(52) U.S. Cl.
CPC .............. *H01L 22/20* (2013.01); *G01R 31/30* (2013.01); *G01R 31/3004* (2013.01); *G01R 31/31718* (2013.01); *G01R 31/31725* (2013.01); *G06F 17/15* (2013.01); *G11C 29/04* (2013.01); *G11C 29/50004* (2013.01); *G11C 29/50012* (2013.01); *G11C 29/56008* (2013.01);
(Continued)

(58) Field of Classification Search
CPC .............. H01L 22/20; G11C 29/50012; G11C 29/56008; G11C 29/04; G11C 29/50004; G11C 2029/0403; G11C 2029/5004; G01R 31/3004; G01R 31/30; G01R 31/31718; G01R 31/31725; H04L 7/042; G06F 17/15; G06F 30/367; G06F 2111/08
See application file for complete search history.

(56) References Cited

U.S. PATENT DOCUMENTS 6,751,519 B1 *  6/2004  Satya ...................... H01L 22/20
                                                            700/109
7,112,979 B2 *  9/2006  Arabi ..................... G01R 31/30
                                                            324/759.01

(Continued)

*Primary Examiner* — Mohammad K Islam
(74) *Attorney, Agent, or Firm* — Weaver Austin Villeneuve & Sampson LLP

(57) ABSTRACT

A method for testing system-on-a-chip (SoC) for faults at subthreshold or substantially at threshold operating voltages includes the steps of testing the SoC for fault at a favorable operating voltage, the testing including measuring a metric characterizing the fault at the favorable operating voltage to obtain a first metric value; and retesting the SoC for the fault at a first operating voltage upon the first metric value at the favorable operating voltage being correlated, according to a metric correlation establishing a correlation relationship between the favorable operating voltage and the first operating voltage, to a second metric value at the first operating voltage within a predictive interval of the metric correlation.

20 Claims, 22 Drawing Sheets

(51) Int. Cl.
*H04L 7/04* (2006.01)
*G01R 31/317* (2006.01)
*G11C 29/50* (2006.01)
*G01R 31/30* (2006.01)
*G11C 29/56* (2006.01)
*G11C 29/04* (2006.01)
*G06F 30/367* (2020.01)
*G06F 111/08* (2020.01)

(52) U.S. Cl.
CPC ............ H04L 7/042 (2013.01); *G06F 30/367* (2020.01); *G06F 2111/08* (2020.01); *G11C 2029/0403* (2013.01); *G11C 2029/5004* (2013.01)

(56) References Cited

U.S. PATENT DOCUMENTS

| | | | | |
|---|---|---|---|---|
| 9,285,417 B2* | 3/2016 | Poindexter | ......... | G01R 31/2853 |
| 9,374,004 B2* | 6/2016 | Mozak | ................ | H04L 25/0276 |
| 9,557,378 B2* | 1/2017 | Bickford | .......... | G01R 31/31718 |
| 9,722,414 B2* | 8/2017 | Chen | ......................... | H02H 3/10 |
| 9,882,564 B1* | 1/2018 | Zangi | ..................... | H03K 5/156 |
| 9,939,880 B1* | 4/2018 | Foreman | ............. | G06F 30/3312 |
| 10,067,184 B2* | 9/2018 | Anemikos | ........ | G01R 31/31701 |
| 2003/0185041 A1* | 10/2003 | Takahashi | ............... | G11C 11/22 |
| | | | | 365/145 |
| 2008/0183409 A1* | 7/2008 | Roberts | ............ | G01R 31/31726 |
| | | | | 702/79 |
| 2009/0027990 A1* | 1/2009 | Houston | ............... | G11C 11/413 |
| | | | | 365/226 |
| 2010/0188115 A1* | 7/2010 | von Kaenel | .......... | G06F 1/3203 |
| | | | | 326/16 |
| 2011/0106497 A1* | 5/2011 | Visweswariah | ......... | G06F 30/30 |
| | | | | 702/182 |
| 2013/0133031 A1* | 5/2013 | Fainstein | ................ | G06F 21/73 |
| | | | | 726/2 |
| 2014/0074422 A1* | 3/2014 | Bickford | ......... | G01R 31/31718 |
| | | | | 702/118 |
| 2014/0184262 A1* | 7/2014 | Poindexter | ......... | G01R 31/2853 |
| | | | | 324/759.03 |

* cited by examiner

METHODS FOR REDUCING CHIP TESTING TIME USING TRANS-THRESHOLD CORRELATIONS

CROSS-REFERENCE TO RELATED PATENT APPLICATION

This application claims priority to and the benefit of U.S. Provisional Application No. 62/514,087, filed Jun. 2, 2017, entitled "Trans-Threshold Delay Correlations Test Methodology and Related System," which is incorporated herein by reference in its entirety.

STATEMENT REGARDING FEDERALLY SPONSORED RESEARCH OR DEVELOPMENT

This invention was made in part with government support under NSF (1035771) and the NSF NERC ASSIST Center (EEC-1160483). The government has certain rights in the invention.

BACKGROUND

Internet-of-things (IoT) devices have become exceedingly prevalent, the number of such devices expected to top the one-trillion mark in the coming decades. Many of these devices may operate in environments with limited access to a continuous power source, thus should be designed to consume minimal amounts of power. Subthreshold system-on-a-chip (SoCs) are suitable for IoT devices in part because they consume orders of magnitude less power than traditional SoCs.

SUMMARY

Figure 1:
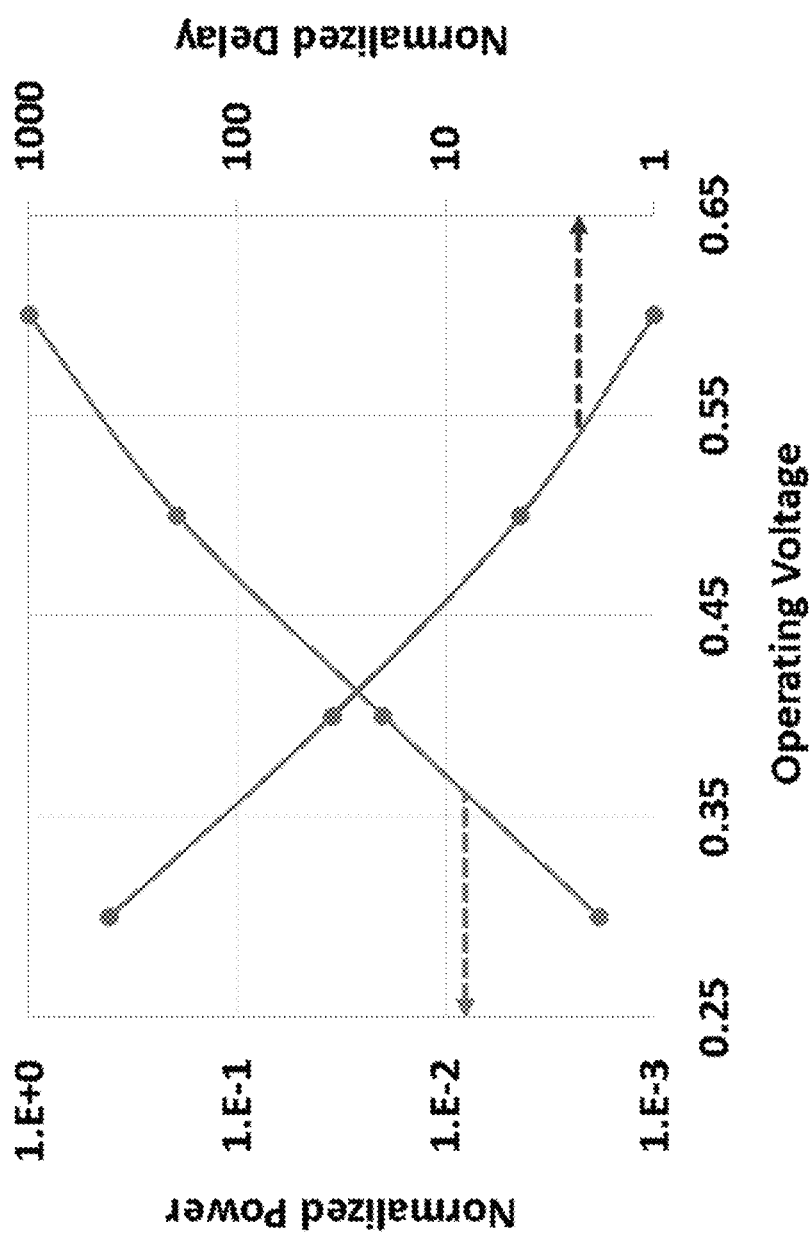
FIG. 1 is a graph that shows the relationship between supply voltage VDD of a digital circuit, which positively correlates with the maximum operating frequency of the circuit, and the power consumption and the at-speed testing delay of the circuit for delay faults, according to some embodiment.

Some embodiments of the current disclosure disclose a method comprising the steps of testing a chip for fault at a favorable operating voltage, the testing including measuring a metric characterizing the fault at the favorable operating voltage to obtain a first metric value; and retesting the chip for the fault at a first operating voltage upon the first metric value at the favorable operating voltage being correlated, according to a metric correlation establishing a correlation relationship between the favorable operating voltage and the first operating voltage, to a second metric value at the first operating voltage within a predictive interval of the metric correlation. In some embodiments, the first operating voltage is (1) less than the favorable operating voltage, and (2) at a subthreshold voltage or substantially at a threshold voltage of a transistor of the chip; and the second metric value being a maximum or a minimum of metric values at the first operating voltage indicating absence of the fault in the chip.

Some embodiments of the current disclosure disclose a method comprising the steps of: determining a favorable operating voltage to test a chip for fault characterized by a metric; establishing a metric correlation between a first operating voltage and the favorable operating voltage, the first operating voltage being (1) less than the favorable operating voltage, and (2) at a subthreshold voltage or substantially at a threshold voltage of a transistor of the chip; identifying a first metric value at the first operating voltage that is an upper limit or a lower limit of metric values at the first operating voltage that indicate absence of the fault in the chip; testing the chip for the fault at the favorable operating voltage, the testing including measuring the metric at the favorable operating voltage to obtain a second metric value; and retesting the chip for the fault at the first operating voltage upon the second metric value at the favorable operating voltage being correlated within a predictive interval of the metric correlation to the first metric value at the first operating voltage according to the metric correlation.

Some embodiments of the current disclosure disclose a method, comprising the steps of (A) testing each chip of a plurality of chips in a sample set for a fault, the testing including measuring a metric related to the fault at (1) a first operating voltage at a subthreshold voltage or substantially at a threshold voltage of a transistor of the chip, and (2) a second operating voltage of a plurality of operating voltages higher than the first operating voltage, a size of the sample set being no smaller than a minimum sample size of a statistically representative sample of chips for a population of chips to be tested for the fault; (B) establishing, based on a plurality of metric values at the first operating voltage and a plurality of metric values at the second operating voltage obtained from the metric measurement, a metric correlation between the metric at the first operating voltage and the metric at the second operating voltage; (C) determining, based on the metric correlation, a proportion of chips in the sample set with a second metric value of the plurality of metric values at the second operating voltage that are correlated within a predictive interval of the metric correlation with a first metric value of the plurality of metric values at the first operating voltage, the first metric value at the first operating voltage being a maximum or a minimum of metric values indicating absence of the fault in a chip of the large population of chips; (D) obtaining a total test time at the second operating voltage based on: a first total time for testing all chips in the sample set at the first operating voltage and, a second total time for (1) testing all chips in the sample set at the second operating voltage and (2) testing the determined proportion of chips at the first operating voltage; (E) repeating (A), (B), (C) and (D) for each operating voltage of the plurality of operating voltages to obtain a plurality of total test times at respective operating voltages of the plurality of operating voltages; and (F) identifying a favorable operating voltage for testing the large population of chips based at least in part on the plurality of total test times.

DETAILED DESCRIPTION

One technique for reducing the power consumption of SoCs is to lower the operating voltage to near or below the threshold voltage (subthreshold voltage) of the transistors in the SoC. One consequence of low voltage operation, however, is lower operating frequency, which may significantly increase the time used to do functional at-speed testing of the chips for faults. For a large number of chips, the total cost of testing in terms of at least time and resources can be significant. This is in particular the case for certain subthreshold SoCs that may contain several digital and analog components that typically would be tested at-speed to detect any manufacturing defects or variations that could potentially cause chip failure. For example, subthreshold systems can have an increased challenge with digital circuits due to the pronounced effects of each device's threshold voltage variation. As another example, smaller variations in current can readily cause failures in logic gates as well as memory cells.

FIG. 1 is a graph that shows the relationship between supply voltage VDD of a digital circuit (labelled "Operating Voltage"), which positively correlates with the maximum operating frequency of the circuit, and the power consumption (labelled "Normalized Power") and the at-speed testing delay of the circuit for delay faults (labelled "Normalized Delay"), according to some embodiment. As VDD is scaled down to the subthreshold region, the power consumption may reduce significantly. Voltage scaling, however, also reduces the maximum operating frequency, which results in a multi-fold increase in delay or at-speed testing time. For example, when VDD is reduced from about 0.6V down to about 0.25V, the power consumption of the digital circuit can decrease by a factor of about 550, while the maximum operating frequency can increase by a factor of almost 1000, leading to an about one thousand-fold increase in test times compared to test times for known non-subthreshold SoCs processors. This, coupled with the fact that subthreshold SoCs are becoming increasingly complex, may significantly increase the test time (and cost) of these systems, discouraging the commercialization of subthreshold SoCs.

Some embodiments of the current disclosure relate to methods for reducing test time for testing faults in subthreshold SoCs (SoCs operating below threshold voltages) and/or SoCs operating substantially at threshold voltage by using trans-threshold correlations that relate operations at normal voltages (nominal or normal operations) to operations near (e.g., substantially at) or below threshold voltages (subthreshold operations). By "substantially at threshold", in some embodiments, it is to be understood that the operations are at voltages above or below the threshold voltage of the SoC within a predefined range. For example, the range may be bounded within about 10% above and below the threshold voltage, i.e., for example, $[V_{Threshold}-0.1*V_{Threshold}, V_{Threshold}+0.1*V_{Threshold}]$. In some embodiments, the range may include 15%, 7.5%, 5%, including values and subranges therebetween, above and below the threshold voltage. In some embodiments, by "substantially at threshold", it is to be generally understood that the operations are at voltages in the vicinity of the threshold voltage where the current has an exponential relationship with the gate-to-source voltage of a transistor in the SoC (e.g., the current's exponential dependence on the gate-to-source voltage is the dominant contribution to the current). In the instant disclosure, discussions about subthreshold operations, subthreshold voltages, subthreshold SoCs, etc., may be understood as referring to operations, voltages, SoCs, etc., respectively, not only at subthreshold (i.e., below threshold) but also "substantially at threshold" as defined above. As such, in some embodiments, by subthreshold operations, it is to be understood that the operations are at subthreshold (below threshold), at threshold itself, and above threshold within the range where the current is exponentially dependent on the gate-to-source voltage (and/or above some percentage (5%, 7.5%, 10%, 15%, etc.) of the threshold region).

In some embodiments, higher $\Delta V$ between the low and high operating voltages can mean exponentially less testing time due to the exponential change in delay as a function of VDD in subthreshold SoCs. For example, the testing time for testing a subthreshold SoC for a fault (such as delay) at a higher (e.g., nominal) voltage can be exponentially smaller than the testing time for testing the same SoC at a lower threshold or subthreshold voltage. This advantage of improved (reduced) testing time can, however, be offset at least to some extent by the weakening of the trans-threshold correlations for higher $\Delta V$.

Leveraging these correlations, the methods allow for, based on high voltage testing at high speeds, predicting at least substantially accurately the test time (e.g., delay for delay faults) and/or power values at the low, subthreshold operational voltages, thereby expediting the identification of functional failures and the binning of chips into groups based on power consumption or maximum frequency. In some embodiments, the methodology may not require additional on-chip circuits, resulting in a post-fabrication solution for testing with no area or form factor overhead.

In some embodiments, the disclosed methods may be used on most or all types or categories of circuits, which include digital circuits, memories and/or analog/mixed signal circuits. For example, the methods can be used to improve or reduce functional test times for digital circuits, memory circuits and analog and mixed signal circuits that operate at a range of voltages.

In some embodiments, the methods disclosed herein can also be applied to test for other types of faults in subthreshold SoCs, besides the above-mentioned delay faults. In general, the methods can be applied to faults that exhibit at least some correlation (varying or not) as a function of operating voltage. The methods can be applied to delay faults, bridging faults and faults such as opens, shorts, and stuck-at faults, which have high correlations at low and high operating voltages. In particular, the latter (opens, shorts, and stuck-at faults) and bridging faults do not change with operating voltage (i.e., have a high correlation between operating voltages) and as such can be tested at any voltage, thereby yielding at least substantially the same or similar result. For example, testing of SoCs at nominal voltages and high frequencies could illuminate these faults, which would be understood to exist at lower operating voltages as well due to their high correlations. The speeding up of testing times can be illustrated by the following example—an SoC that normally operates at 300 or 400 mV can be tested for these faults at the process technology's nominal voltage (approximately 1V) resulting in over 1000 times speed up in testing for these cases.

Different faults may have different correlations as a function of voltages, since the faults behave differently throughout voltages of operation. Delay faults, for example, may appear at higher system frequencies with increased voltage. Some types of faults, such coupling faults, in contrast, appear at higher voltages while not existing at lower voltages, due to higher transition speeds increasing coupling effects. Testing of SoCs at nominal voltages and high frequencies could illuminate these faults.

Below, delay faults are explored in more detail as example embodiments. It is to be understood, however, that the same methods can be used to test for other types of faults, provided that the faults display at least some correlation between high (e.g., nominal) operating voltages and low (e.g., near or below) threshold voltages.

In some embodiments, if paths of slow transistors (high threshold voltage caused by variation) cause a propagation delay longer than the clock period, a delay fault (setup violation) may be present. Functional tests can be applied at the operational speed of the SoC to test for delay faults. In such embodiments, different transistors in an SoC may have different threshold voltage and as such a different delay curve as a function of voltage, which can result in delay faults with diminished correlations between a large change in test voltage $\Delta V$. In such embodiments, a subset of chips can be used for characterization to obtain delay correlations between chips operating at a low voltage and nominal voltage. These correlations may give further insight into how the SoC's delays over voltage changes, facilitating high speed testing of other chips of the same or similar design.

In some embodiments, a metric that can characterize the fault of a circuit (such as delay fault) and is dependent on the operating voltage of a circuit can be used to establish a trans-threshold metric correlation, i.e., a metric correlation between the metric at a high operating voltage and the metric at a low (near or below threshold) operating voltage. For example, the maximum operating frequency of a circuit is a function of that circuit's voltage and as such, the metric correlation that can be established can take the form of a frequency correlation between maximum operating frequency of the circuit at the high operating voltage and the maximum operating frequency at the low operating voltage. The correlation can be established as a result of variations in chips, where one chip's change of maximum operating frequency as a result of a change in voltage may be different than another chip's change of maximum operating frequency as a result of the same change in voltage. For example, increasing the voltage of an SoC during testing can decrease overall test time by increasing the maximum operating frequency. Because of variations, however, not every chip's maximum frequency can change by the same multiple for a given voltage change, which means the decrease in the overall test time can be different between chips. Given multiple chips, however, a correlation between the distributions at higher voltages and at lower voltages can be established, which then can be used to perform functional testing for a delay fault at the higher voltages while at least substantially accurately predicting expected frequencies at the lower voltages. This will allow for characterization of how the circuit will fail at lower voltages for chip yield in manufacturing.

In some embodiments, a correlation that can be formed between a metric at different operating voltages may depend on the differences between the voltages, $\Delta V$, i.e., the difference between the high operating voltage (test voltage) and the low operating voltage. Stronger or higher correlations allow one to predict results (such as power consumption or delay) at the low (high) operating voltage based on knowledge at the high (low) operating correlation. For example, to determine delay in a circuit at low operating voltages, circuits with a high enough delay correlation between high and low voltages can be tested at high voltages, and one can predict how the circuit will operate at the lower voltage based on the correlation. For example, one can predict the delay at the lower operating voltage, and classify the circuit as defective or not based on this prediction (e.g., defective if the predicted delay is higher than some chip failure threshold).

Figure 2:
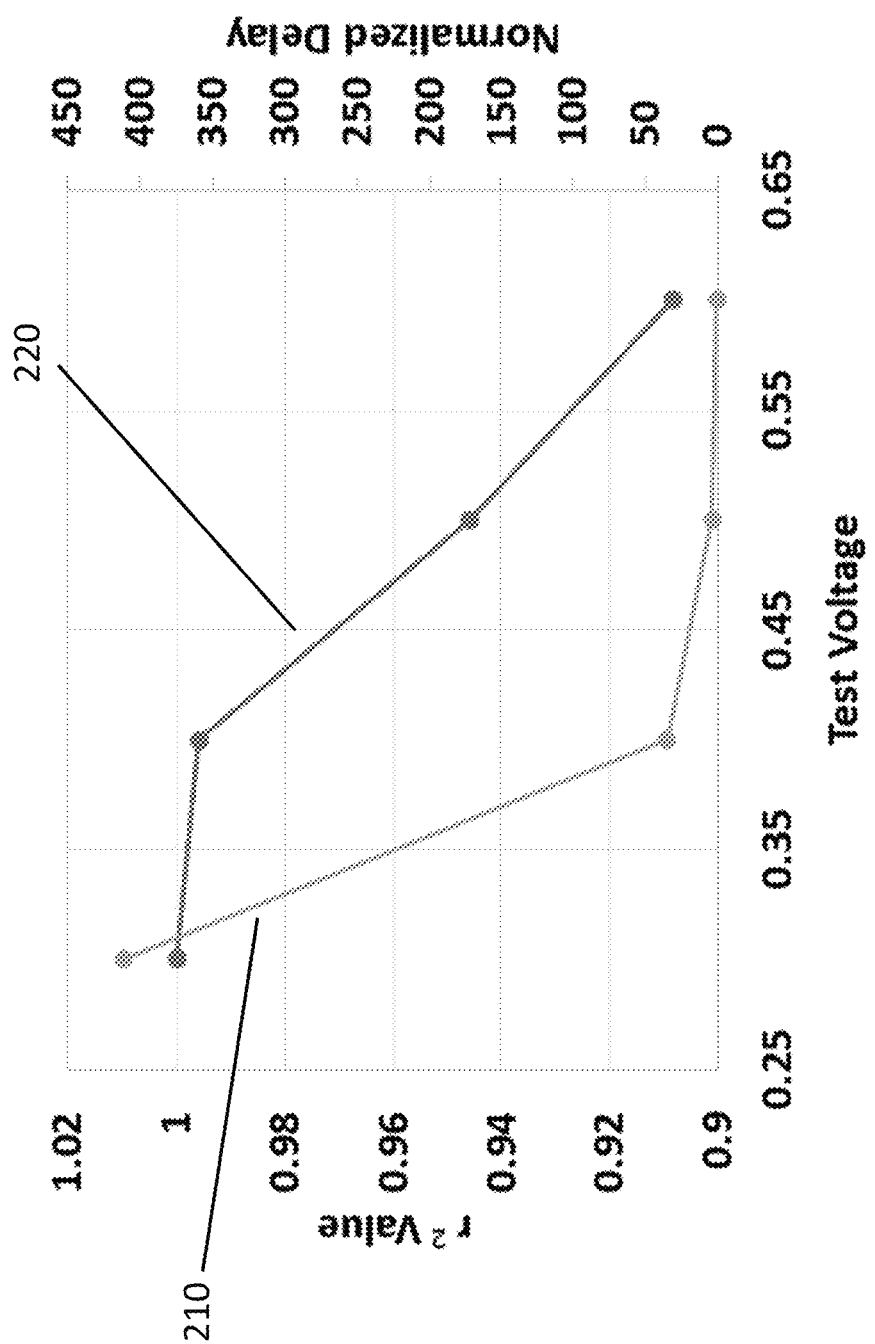
FIG. 2 is a graph that shows the measured delays, and correlation thereof, of a fabricated digital block at different operating voltages, according to some embodiment.

In some embodiments, higher $\Delta V$ between the low and high operating voltages can mean exponentially less testing time due to the exponential change in delay as a function of VDD in subthreshold SoCs. For example, the testing time for testing a subthreshold SoC for a fault (such as delay) at a higher (e.g., nominal) voltage can be exponentially smaller than the testing time for testing the same SoC at a lower threshold or subthreshold voltage. This advantage of improved (reduced) testing time can, however, be offset at least to some extent by the decrease in the strength of the correlation of the metric at the two voltages, the high and low operating voltages. In some embodiments, this may be because the prediction based on the correlation may not be as reliable, and a retest at the lower voltage may be recommended, leading to an overall increase in test time. For example, FIG. 2 is a graph that shows the measured delay of a fabricated digital block (labelled "Normalized Delay") at different voltages (labelled "Test Voltage") and the correlation between its delays at increased $\Delta V$ values as measured by the $R^2$ values 210 of the measured delays data set, according to some embodiment. Even though the delay 220 decreases with increasing $\Delta V$, the $R^2$ 210 of the correlation also decreases. That is, although the decreased delay may result in faster test time, the reduced correlation may indicate that the predicted delay at the low operational voltage can be less accurate, and some proportion of the chips in the sample set may have to be retested at the low operational voltage to improve accuracy, which can reduce the overall improvements in test time. Thus, in some embodiments, a favorable (e.g., optimal) test voltage exists that balances the speedups gained from high voltage testing and the drawbacks of retesting (due to weakened metric correlation at the low (subthreshold) and the high testing voltage).

In some embodiments, the methods for reducing testing times of subthreshold chips include the testing of subthreshold chips at a high voltage to draw at least substantially accurate conclusions or predictions at a lower voltage based on statistical analysis. In some embodiments, this methodology can be divided into two phases: a characterization phase and a test phase. The characterization phase may start by establishing metric correlations at different $\Delta V$ to determine a favorable $\Delta V$ for testing the chips (e.g., to determine an optimal $\Delta V$ that would result in lowest overall testing time). Initially, a statistically adequate sample size may be determined for a given population of chips. For example, by using statistical power analysis, the sample size (e.g., minimum size) of a set of chips that can be used to statistically represent the larger population of chips can be determined. In some embodiments, stratified sampling where samples from known groups are taken to potentially decrease the sample size can be used. In the case of chip testing, this would correspond to taking samples from all process corners of a wafer to achieve a sample set more representative of the entire population.

Using the chips in the sample set, in some embodiments, metrics that characterize the chip fault of interest may be measured at the low (threshold or subthreshold) operating voltage and one or more higher operating voltages. For example, to characterize delay faults, the maximum operating frequency of the chips (which may be considered as the metric) may be measured at the low and higher operating voltages. In some embodiments, based on these metric measurements, for each higher operating voltage, a metric correlation between the metric values at the low operating voltage and the metric values at that higher operating voltage may be established. For example, for delay faults, for each higher operating voltage, a correlation correlating or relating the maximum operating frequencies at the low operating voltage and the maximum operating frequencies at that higher operating voltage may be established. The strength of the correlation may be characterized using its $R^2$ value ($R^2$ being 1 indicating perfect correlation).

Figure 3:
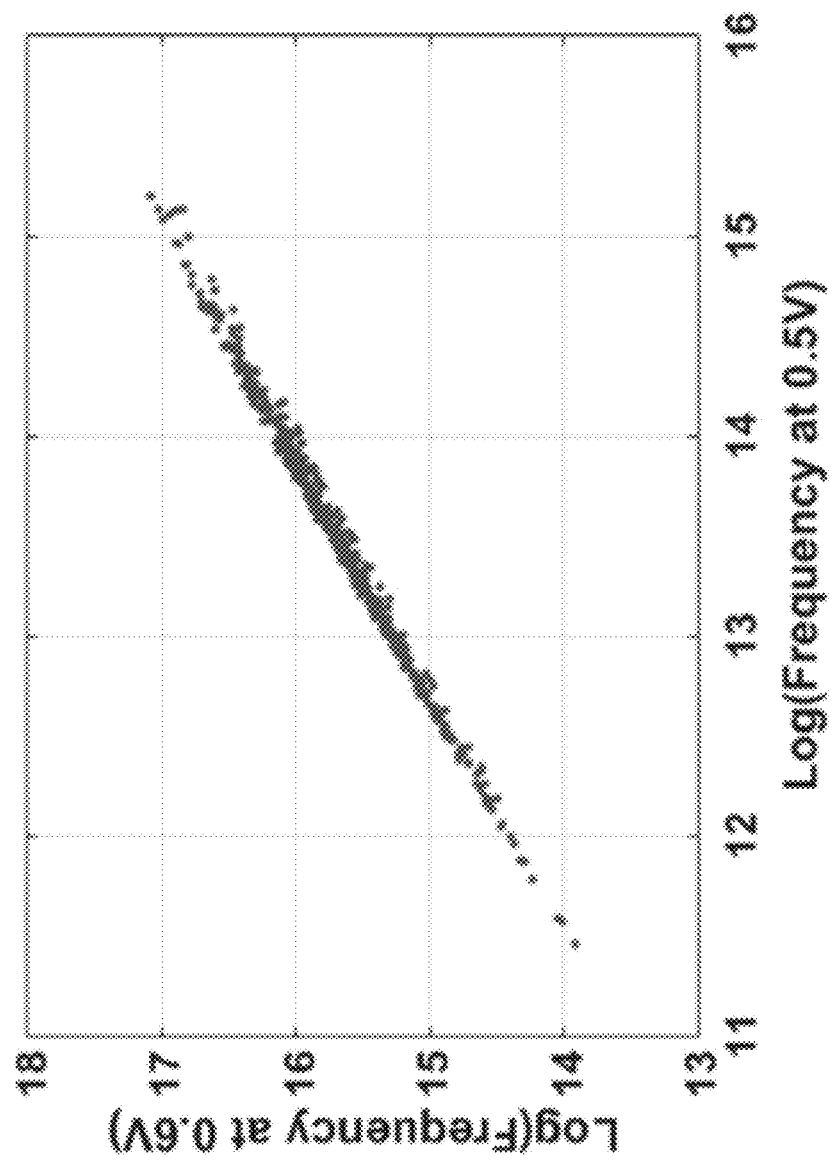
FIG. 3 is a graph that shows example simulated Monte Carlo frequency correlation characterizing a delay fault in a ring oscillator operating at 0.5V and at 0.6V, according to some embodiment.
Figure 4:
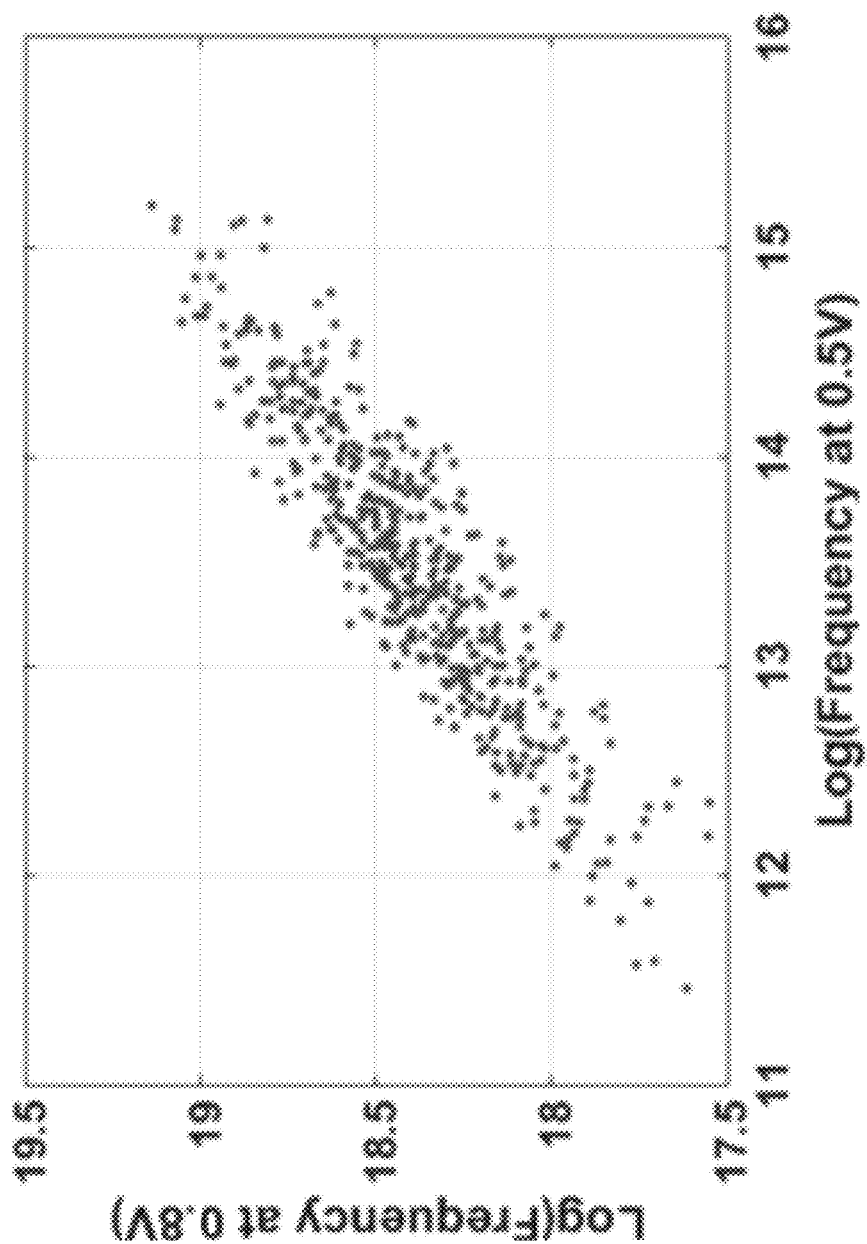
FIG. 4 is a graph that shows example simulated Monte Carlo frequency correlation characterizing a delay fault in a ring oscillator operating at 0.5V and at 0.8V, according to some embodiment.
Figure 5:
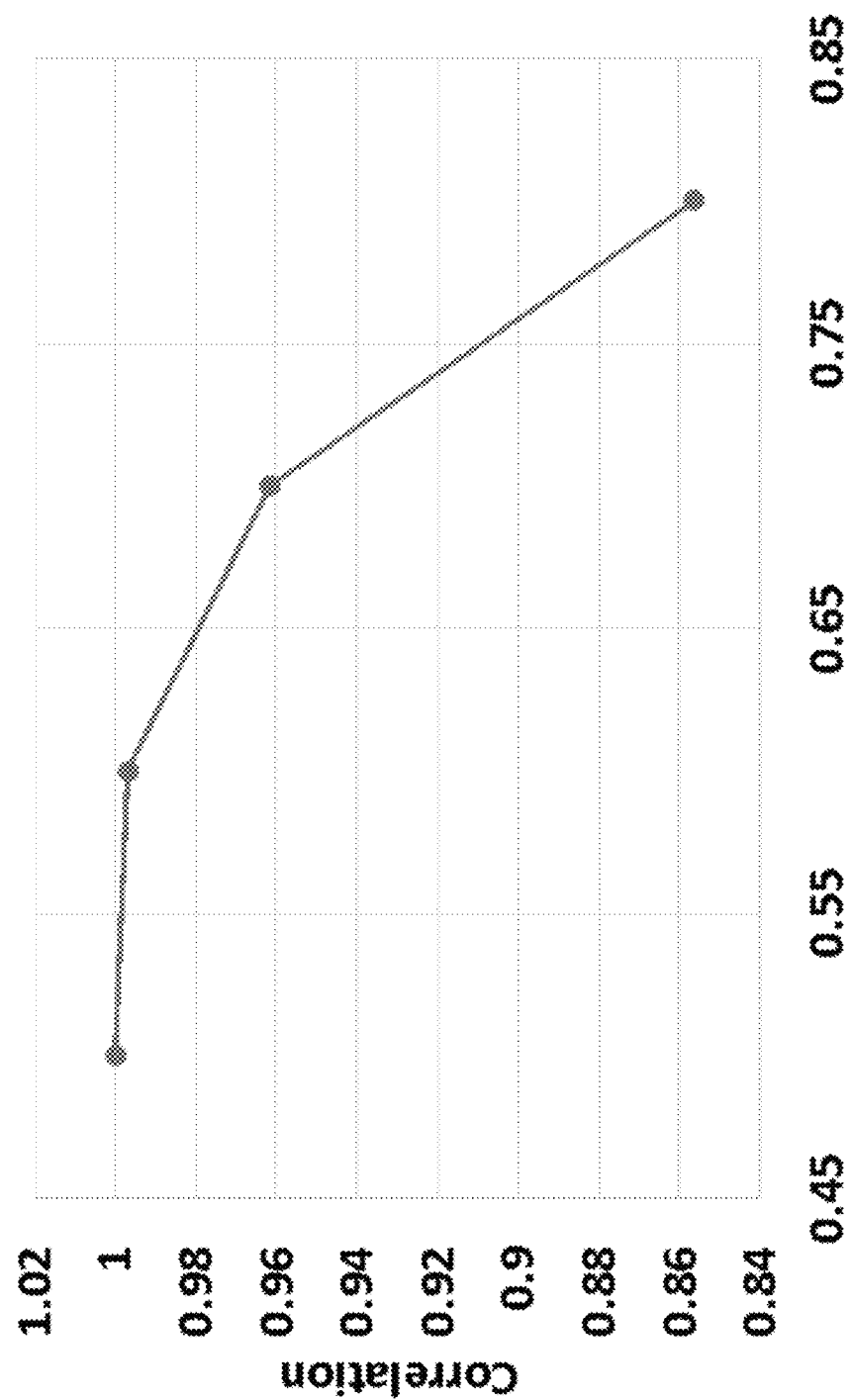
FIG. 5 is a graph that shows the correlation between delays at a subthreshold operating voltage and delays at higher voltages as measured by the $R^2$ value of a ring oscillator, according to some embodiment.

To illustrate the above discussion, the particular embodiment of the simulation of a thousand ring oscillators (RO) performed for delay faults is used to obtain the correlation depicted in FIG. 3. In the simulations, these thousand ROs are used as the sample set (a statistically significant or adequate sample set for a much larger population of ring oscillators). The maximum operating frequencies (the metric characterizing delay) of these thousand ROs are determined (simulated and/or measured) at a low (subthreshold) operating voltage of 0.5V and at a higher operating voltage of 0.6V, and a correlation is established between the measurements of the frequencies at 0.5V and 0.6V. As shown in FIG. 3, a strong correlation exists between the maximum operating frequencies at the two voltages (a perfect correlation, i.e., $R^2=1$, would have resulted in all the data points lining up along a straight line). FIG. 4 is a graph that shows another example embodiment of a correlation between frequencies at 0.5V and at 0.8V, visibly weaker than the correlation between 0.5V and 0.6V as evidenced by the wider distribution of the data points, which is the result of the larger difference (0.8V−0.5V=0.3V) compared to that of FIG. 3 (0.6V−0.5V=0.1V). FIG. 5 is a graph that shows example embodiments of $R^2$ as a function of voltage differences between the low and higher operating voltages, which shows the weakening of the strength of the correlation as the voltage differences increase.

Figure 6:
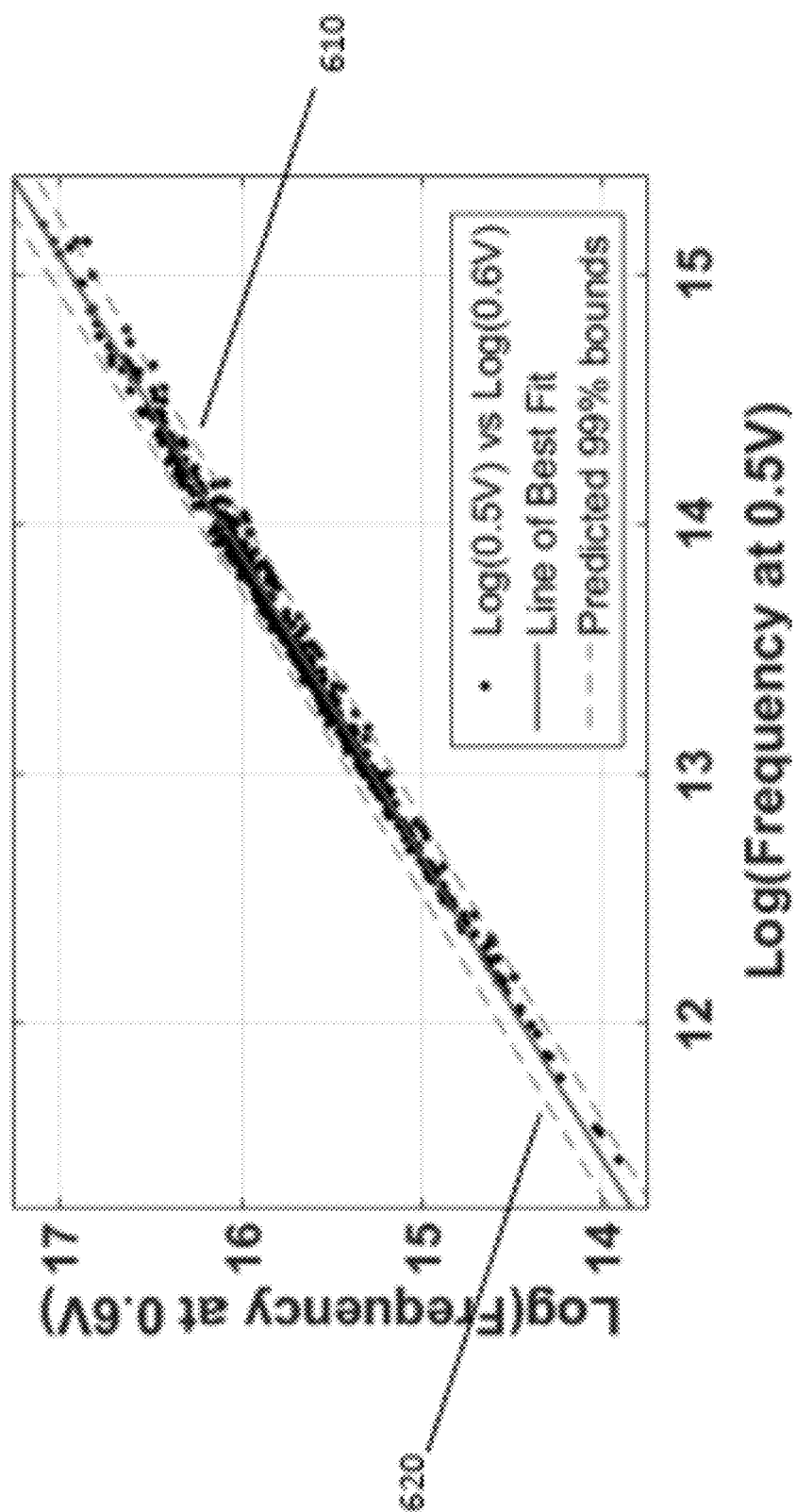
FIG. 6 is a graph that shows example simulated Monte Carlo frequency correlation with a prediction interval characterizing a delay fault in a ring oscillator operating at 0.5V and at 0.6V, according to some embodiment.

Once a metric correlation is formed, in some embodiments, a prediction interval, which is an estimate range of future observations based on the existing sample set, may be determined for the correlation based on a desired certainty level. The prediction interval, in effect, sets the ranges of correlation metric values within which the next measured metric value falls with a probability value of the desired or specified certainty level. For example, returning to the example embodiment of FIG. 3 (correlation of maximum operating frequencies between 0.5V and 0.6V), and referring to FIG. 6, which is a graph that shows the simulation or measurement of the maximum operating frequency of the $1,001^{st}$ chip will result in a frequency correlation value that falls within the prediction interval defined by the lower bound 610 and the upper bound 620 with a 99% probability.

Upon establishment of a metric correlation for a higher operating voltage and upon determination of a prediction interval, in some embodiments, a specified metric value at the lower voltage representing the metric point of defined failure may be identified. This specified metric value at the lower voltage can be the upper limit of metric values that identify the presence of the fault in chips. In some embodiments, depending on the type of metric (which may be dependent on the type of the fault, for example), the specified metric value at the lower voltage may be the lower limit of metric values that identify the presence of the fault in chips. For example, for delay faults where the measured metric is the maximum operating frequency of the chips, the specified metric value can be the upper limit of the frequency values that identify the presence of a delay fault in the chips (i.e., when a measurement for maximum operating frequency at the lower voltage obtains the upper limit (or values no greater than the limit), it may be understood that the chip being measured contains a fault). For a different metric type, for example if the metric characterizing the fault is the inverse of the maximum operating frequency, the specified metric value would be the lower limit of the periods that identify the presence of fault in the chips (i.e., when a measurement for clock period at the lower voltage obtains the lower limit (or values exceeding the limit), it may be understood that the chip being measured contains a fault).

Upon the identification of the specified metric value at the lower voltage, in some embodiments, the range of metric values at the higher operating voltage that are correlated with the specified metric value within the prediction interval may be determined using the metric correlation. Since these metric values at the higher voltage are correlated with the metric point of defined failure (at the lower voltage) based on a correlation with some certainty or probability level, the metric values may not identify the presence of a fault with complete certainty. In the embodiment where the specified metric value at the lower voltage is the upper limit of metric values that identify the presence of the fault in chips, the upper limit of the range of metric values at the higher operating voltage that are correlated with the specified metric value may be understood as the point of uncertain failure. Similarly, when the specified metric value at the lower voltage is the lower limit of metric values that identify the presence of the fault in chips, the lower limit of the range of metric values at the higher operating voltage that are correlated with the specified metric value may be understood as the point of uncertain failure. In any case, this point of uncertain failure can be determined by correlating the point of defined failure at the low operating voltage to the high voltage while taking into account the prediction interval.

Figure 7:
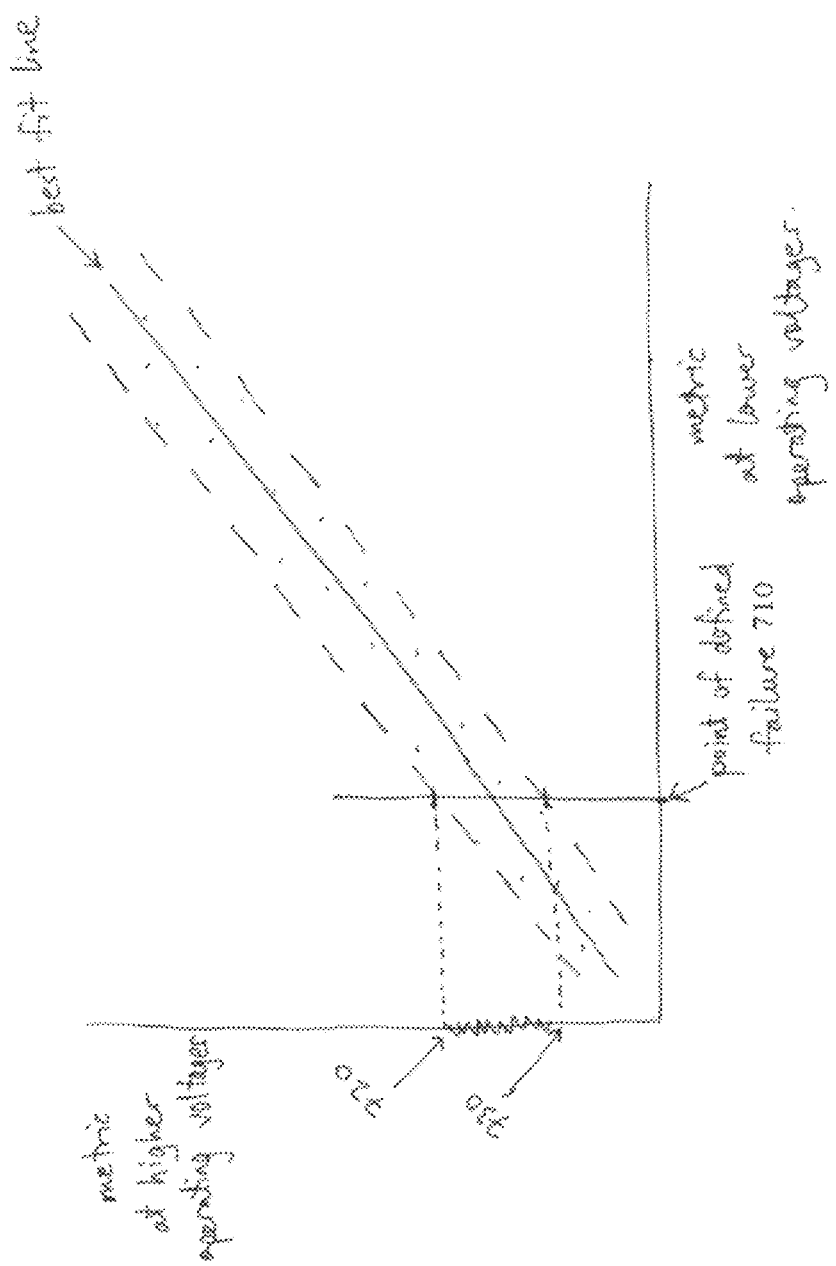
FIG. 7 shows a schematic metric correlation illustrating the range of values of, according to some embodiment.

Referring to the embodiment of FIG. 7 for illustration purposes, once the specified metric value at the lower voltage, i.e., the point of defined failure 710, is identified, the metric values at the higher voltages lying between the first limit 720 and the second limit 730 may represent the range of metric values at the higher operating voltage that are correlated with the point of defined failure 710 within the prediction interval. These metric values, as noted above, do not identify chips with faults with complete certainty, and as such, when a chip measured for the metric value at the higher voltage returns one of these metric values, the chip may have to be tested again at the lower voltage to ascertain the existence or absence of the fault in the chip. Retested chips with metric values at the lower voltage equal to or no greater than the point of the specified metric value (i.e., the point of defined failure) when the specified metric value is the upper limit can be classified or binned as having the fault while those with metric values greater than the specified metric value can be classified as fault-free. For example, after retesting a chip by measuring its maximum operating frequency (period) at the lower voltage, the chip may be classified as having the fault if the measured frequency (period) is less (greater) than the upper (lower) limit of the frequency (period) values that identify the presence of a delay fault in the chips.

Figure 8:
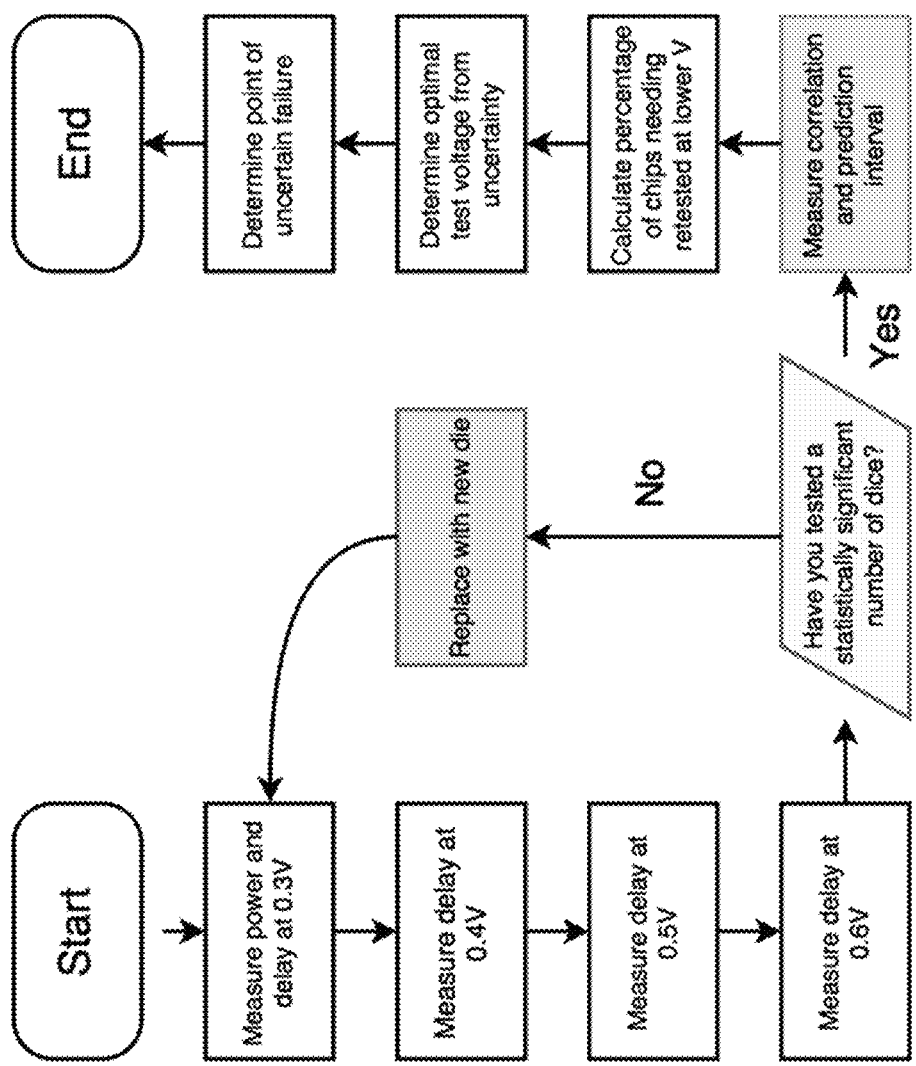
FIG. 8 shows a flow chart illustrating the steps of a characterization phase of the methods disclosed herein for reducing testing times SoCs operating at near threshold or subthreshold voltages, according to some embodiment.
Figure 9:
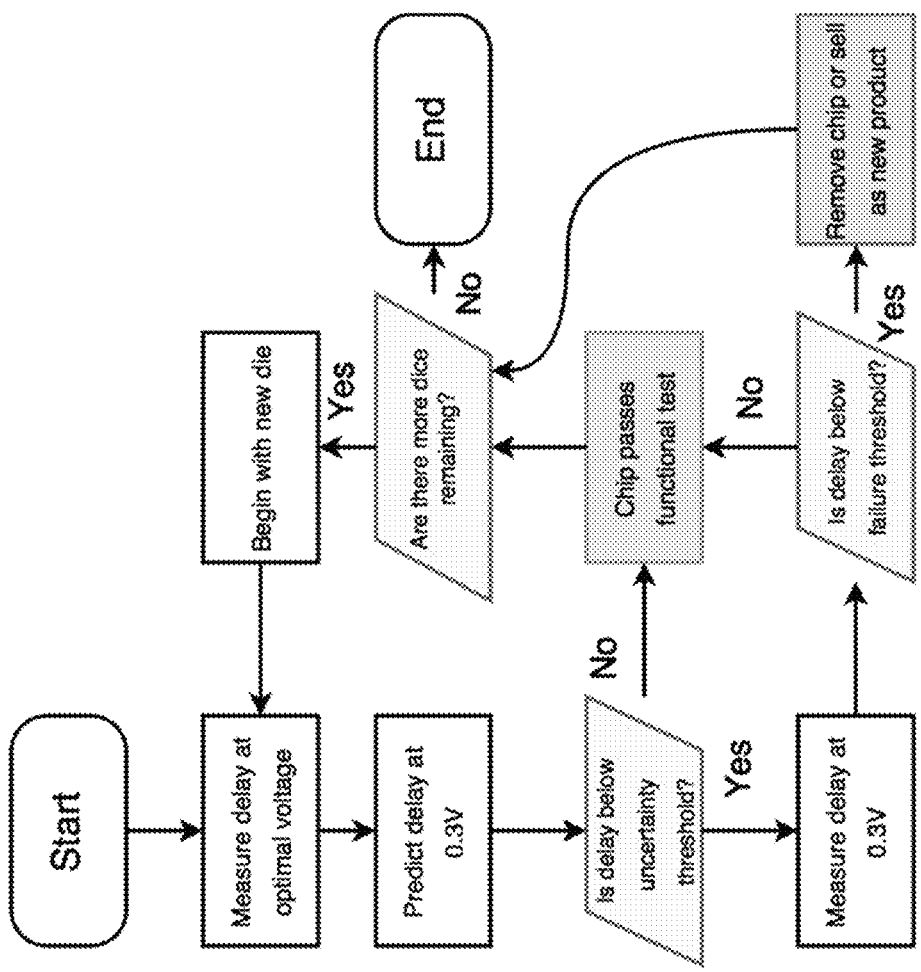
FIG. 9 shows a flow chart illustrating the steps of a testing phase of the methods disclosed herein for reducing testing times SoCs operating near threshold or subthreshold voltages, according to some embodiment.

By repeating the above discussed process for multiple higher voltages, in some embodiments, an optimal or nearly optimal higher voltage that results in the minimum or nearly minimum overall testing voltage may be determined. Testing at higher voltages can be time efficient due to increased maximum operating frequency. But this efficiency can be offset at least to some extent by re-testings at the lower voltage, which can be time consuming since the re-testings have to be done at low (even subthreshold) voltages. As such, in these embodiments, a favorable or optimal or nearly optimal higher voltage may exist at which the overall test time, the time for testing all chips in the sample test at the higher voltage, plus the retesting time of the "uncertain" chips at the lower voltage, for a fault in chips can be minimal or nearly minimal (at least within a predefined range that includes the favorable or optimal voltage). FIG. 8 shows an example flow chart illustrating the characterization phase of some methods disclosed herein for reducing testing times of subthreshold chips. Upon the determination of the favorable voltage from the characterization phase of the methodology for testing subthreshold or nearly subthreshold SoCs, in some embodiments, the testing phase includes the testing of each chip of the initial total population at the favorable voltage for the fault. In some embodiments, the testing may include measuring the metric value at the favorable voltage to obtain each chip's favorable voltage metric value. Using a correlation between the metric at the low (subthreshold, for example) voltage and at the favorable voltage, in some embodiments, the metric value at the low voltage that corresponds to the favorable voltage metric value may be determined. If this metric value at the low voltage is equal to or less than the point of defined failure (if the point of defined failure is the upper limit), then the chip can be classified as faulty (or having the fault). If this metric value at the low voltage is correlated with the point of defined failure (i.e., correlated within the prediction interval), then the chip may be retested at the lower voltage. Otherwise, the chip can be classified as fault-free. FIG. 9 shows an example flow chart illustrating the testing phase of the methods disclosed herein for reducing testing times of subthreshold chips.

In some embodiments, the above discussed characterization of the methods for reducing testing times of chips near or below threshold voltages can be summarized as follows:

Determine Sample Size: The sample size may have a strong statistical power, and can include samples of the present population. The minimum sample size can be determined using statistical power analysis.

Determine Sample Method: The sampling method for selecting chips to be included in the sample set may depend on the availability of chips from different wafers; however, simple random sampling can also be used. In some embodiments, stratified sampling can also be used to select the sample set chips. In some embodiments, the chips in the sample set may come from the larger population of chips that are slated for testing, which would enhance the accuracy of the methods for reducing testing times.

Test Sample Chips: The delay and other relevant metrics are measured at multiple test voltages for the sample set to create (or define) a model of the population. In some embodiments, test time of characterization (i.e., test time for the chips in the sample set) can be insignificant due to the small relative number of chips used for characterization in comparison to the number of chips generally produced commercially (i.e., the number of chips in the total population slated for testing). For example, commercial chip fabrication is usually in the millions of chips per product, while tens or few hundreds of chips may be enough to get the desired statistical significance level.

Calculate Correlation as Function of Voltage: Based on the previous step, the correlation between each $\Delta V$ is calculated, $\Delta V$ representing the difference between the multiple test voltages and the near threshold or subthreshold voltage, and the prediction interval is defined. Further, the prediction interval may be used to determine the point of uncertain failure at each test voltage.

Optimize Test Time: In some embodiments, higher voltage testing can be faster but may result in wider prediction intervals, and thereby increasing the number or proportion of chips that may have to be retested at the low operation voltage. At this step, the total test time, which is the time used to test all chips at the high voltage plus the time used to retest the uncertain chips at the low operating voltage, may be calculated. Then, the test voltage at which the total test time is minimal or at least substantially minimal compared to the other test voltages, may be identified. In some embodiments, this voltage and its corresponding point of uncertain failure may be used to test the remainder of the chips in the total population of chips.

In some embodiments, following the characterization phase of the methods for reducing testing times of chips near or below threshold voltages, the testing phase may take place, which can be summarized as follows:

Test at Optimal Voltage: Each chip in the total population set may be tested at the optimal high test voltage to obtain delay and other metrics.

Calculate Predicted Delay: Once the high voltage delay is determined, the correlation model and prediction intervals may be used to predict the metric and delay values at the low (e.g., subthreshold) operating voltage. In some embodiments, if the predicted delay is below the point of uncertain failure, the chip may be retested at the low operational voltage. In some embodiments, the predicted delay may be below the point of defined failure, in which case the chip may be classified as defective and it may not be retested to save retesting time and further reduce total testing time. Otherwise, the chip passes the test.

Retest Chips on Tail of Prediction Interval: If the high voltage testing determines that a chip is to be retested, this chip may be retested at the low operating voltage. If its delay is below the point of defined failure, this chip can be classified as failing. Otherwise, this chip can be classified as successful.

Illustrative Example Application of the Methods Disclosed Herein to Test for Delay Faults in a Simulated Ring Oscillator To illustrate the applicability of the disclosed methods for reducing testing times of near threshold or subthreshold chips, the method is applied below to a small ring oscillator (RO), with variations in the ROs simulated in SPICE using Monte Carlo to obtain metric correlations at different operating voltages.

In the example application, a thousand samples were randomly selected from a global corner (which includes samples from all process corners) of a wafer and used as the sample population. These samples were simulated at different voltages and their maximum frequencies determined. FIG. 3 shows the high correlation between the subthreshold operating voltage (0.5V) and a higher voltage (0.6V). Increasing the test voltage (i.e., the higher voltage) further reduces the delay of the circuit under test but it also reduces the correlation. FIG. 4 shows the reduced correlation between the delays (or rather frequencies characterizing the delay faults) at 0.5V and 0.8 V.

The correlations were calculated between the frequencies at each test voltage and the frequencies at the subthreshold operating voltage. In the case of subthreshold circuits, the logarithm of the frequencies was taken to allow correlation calculations on a linear, Gaussian sample set. Taking the logarithm of the metric characterizing delay in the RO, the maximum operating frequency of the RO, allows for a linear regression to find the best fit, due to the log-normal delay distribution of subthreshold transistors. Residuals show the completeness of the regression. Next, the line of best fit may be determined to visualize how well the delays correlate. The line of best fit has an $R^2$ value that calculates the error. The higher the $R^2$ value is, for example higher than about 0.9, the more it means the prediction interval would be compact or limited, resulting in fewer chips to retest (i.e., fewer proportion of the chips in the sample set). Whether the line of best fit is close enough to use the correlation for testing purposes can be gleaned from inspecting the residuals for patterns. Residuals showing little or no pattern and a high $R^2$ value mean that the line of best fit can be used for at least substantially accurate prediction. As such, in some embodiments, for the line of best fit to be used, the $R^2$ value may be greater than a minimum correlation threshold (e.g., no smaller than about 0.9, about 0.95, about 0.99, etc.). FIG. 5 shows the correlation between delays at the subthreshold operating voltage (0.5V) and delays at higher voltages as measured by the $R^2$ value, which shows decreasing correlation as the test (higher) voltage is increased.

Once the correlations are obtained, for each test voltage, a prediction interval is calculated using the test voltage sample delays. The equation $y \pm t\sqrt{(s^2 + xSx^T)}$ can be used to calculate the bounds of the prediction interval, where $s^2$ is the mean squared error between delays, t is the confidence level (e.g., 99% level used in this example and shown in FIG. 6), S is the covariance matrix, x is a row vector of the design matrix or Jacobian evaluated at a specified predictor value.

Figure 11:
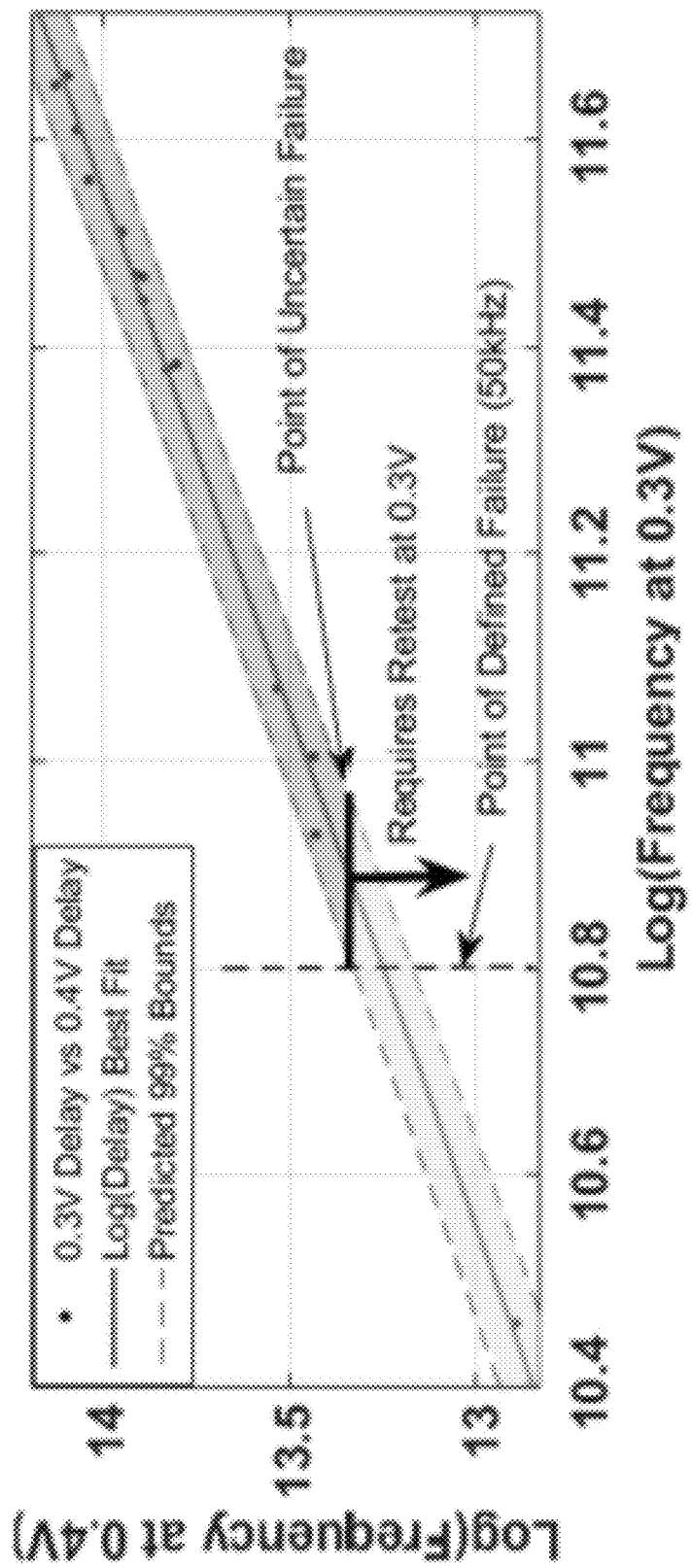
FIG. 11 is a graph that shows example correlation between measured delay values at a subthreshold operating voltage 0.3V and a higher test voltage 0.4V characterizing a delay fault in a digital circuit, according to some embodiment.
Figure 13:
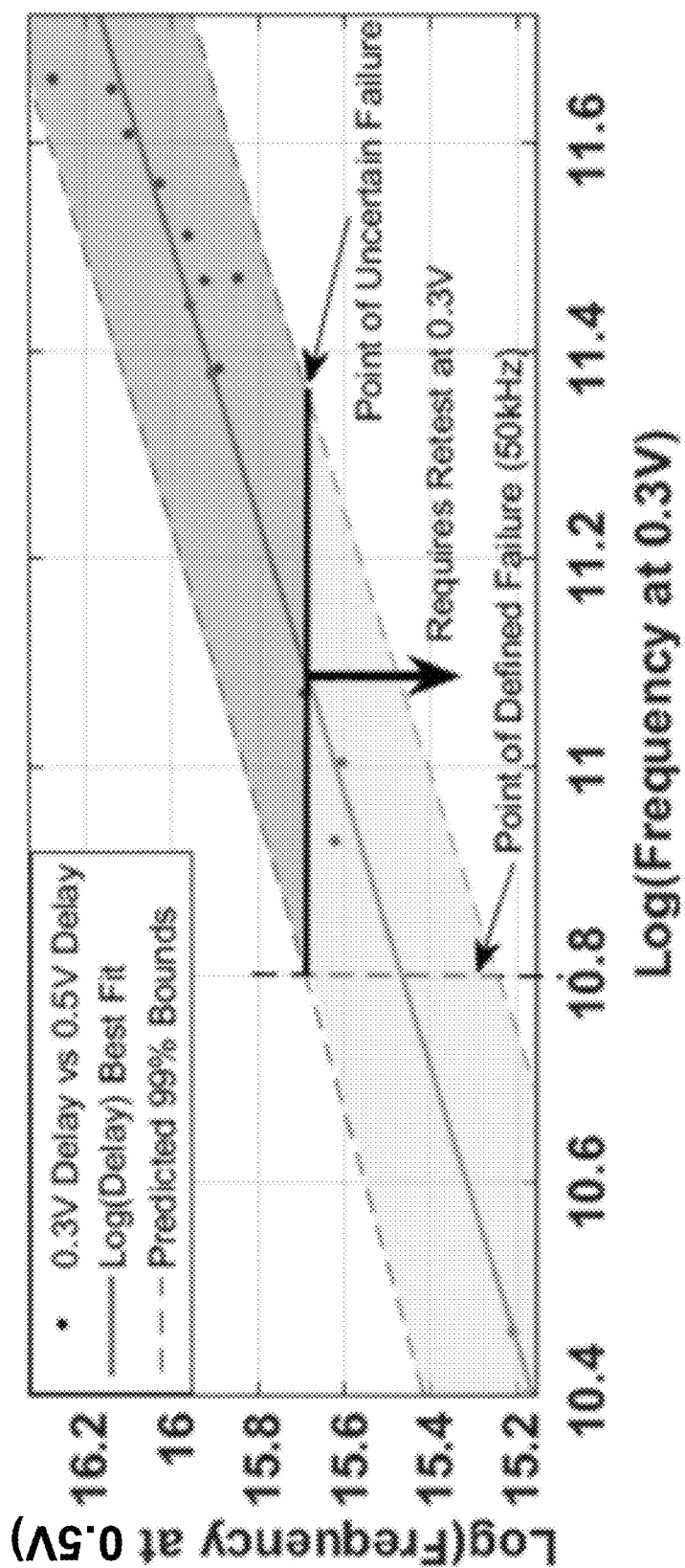
FIG. 13 is a graph that shows example correlation between measured delay values at a subthreshold operating voltage 0.3V and a higher test voltage 0.5V characterizing a delay fault in a digital circuit, according to some embodiment.
Figure 15:
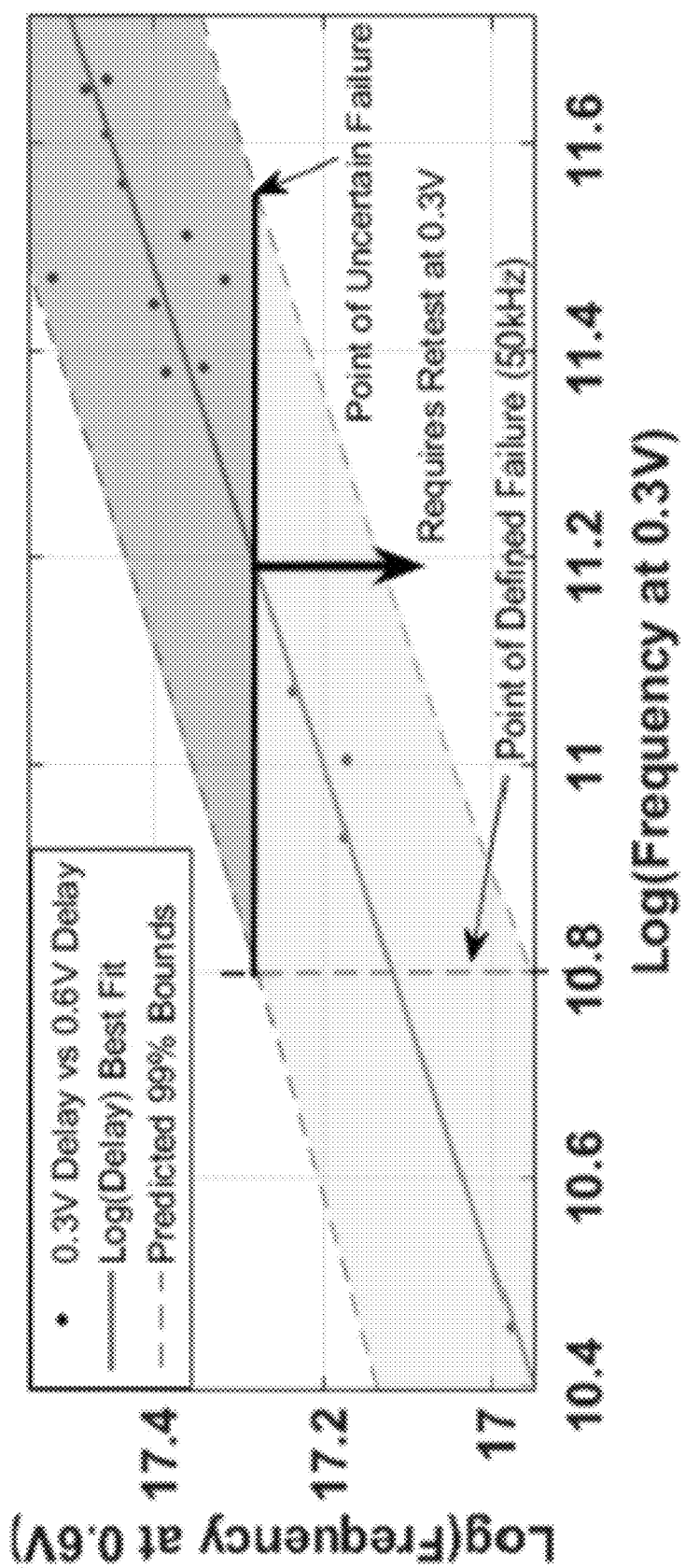
FIG. 15 is a graph that shows example correlation between measured delay values at a subthreshold operating voltage 0.3V and a higher test voltage 0.6V characterizing a delay fault in a digital circuit, according to some embodiment.

Next, the point of uncertain failure can be determined as the point where the slower bound of the prediction interval meets the point of defined failure (refer to FIG. 11, 13 or 15). Any chip with a frequency (delay duration) below (above) this line at the higher voltage has a significant probability of failing at the lower voltage. Chips having frequencies (delay durations) above (below) the point of uncertain failure pass the high speed test and do not need retested. Chips containing high delay points, where the entire prediction interval is above the point of definite failure are automatically deemed failures, or are binned as high delay products.

Upon determining the prediction intervals for the correlations at each test voltage, the percentage of chips that is to be retested for a given voltage is determined by calculating the z score of the boundary using the mean and standard deviation of that voltage's delay. Total test time is calculated using the retest percentage and the average low voltage delay $D_{VLow}$. A line of best fit can be used to interpolate and estimate the favorable or optimal test voltage to be used on the entire population of chips. The process can then be verified if necessary by retesting the characterization population at the optimal voltage. Total test time as a percentage of the test time at the designed low voltage $V_{Low}$ follows the equation:

$$T_{Total}(\%) = (T_{HighSpeed} + T_{ReTest}) * 100 / D_{VLow}, \text{ where}$$

where the high speed test time is defined as $T_{HighSpeed} = N_{Chips} * D_{VHigh}$, and the retest time is defined as $T_{ReTest} = N_{Failed} * D_{VLow}$.

Figure 10:
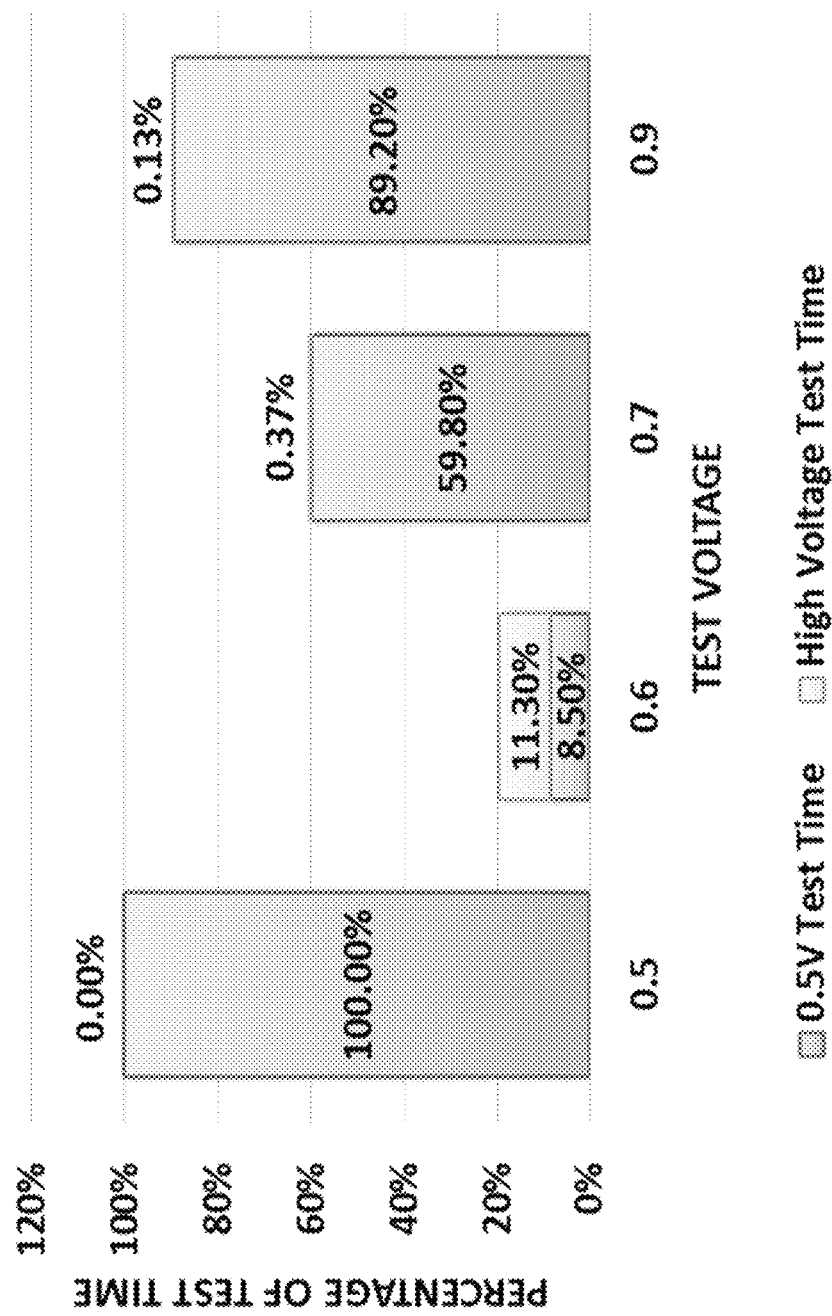
FIG. 10 shows example bar chart illustrating simulated total test times for testing a simulated ring oscillator at a plurality of test voltages including a voltage near threshold or subthreshold voltages, according to some embodiment.

$D_{VHigh}$ and $D_{VLow}$ are defined as the average delays at the high test voltage and the low operational voltage, respectively. These values are calculated as the means of the sample set delays at the corresponding voltages. The optimal value of $T_{Total}$ (i.e., the smallest value of $T_{Total}$ of all test voltages) is determined through the trade-offs between $T_{HighSpeed}$ and $T_{ReTest}$. The desired (or preselected or predetermined) certainty of the prediction interval (99% in this example embodiment), the number of samples (1000 ROs in this example embodiment), and the strength of correlation determine the prediction interval window width, and as a result, what percentage of chips are to be retested. In the instant example embodiment, high speed testing at 0.6V was about five faster, and a 99% prediction interval means that only about 8.5% of the chips are to be retested at 0.5V, resulting in a total test time of about 19.8% when compared to the 0.5V benchmark. FIG. 10 shows the simulated results for test voltages of 0.6V, 0.7 and 0.9V when the subthreshold voltage is 0.5V.

Using FIG. 10, the favorable or optimal test voltage (the test voltage with the least $T_{Total}$, at least for test voltages in a predefined voltage interval including the test voltage) and its corresponding prediction interval window size can be determined. Interpolating between simulated voltages allows for an analytical minimization of test time. For the instant example embodiment of ROs, the favorable or optimal test time was found to be about 0.59V (that is approximately the same test time as 0.6V), an about 5 times savings in subthreshold SoC delay test time.

In some embodiments, this methodology of using trans-threshold correlations to reduce test time can also be used to predict average power during an operation, or to find correlations in delay as a function of temperature change, lessening or removing the need to test all chips in a temperature chamber.

Example Experimental Applications of the Methods Disclosed Herein

In some embodiments, the testing methods disclosed herein and applied above to simulated ROs were used to test digital circuits and memory circuits. Multiple test chips including a circuit with combinational and sequential logic having a counter and a low power SRAM were manufactured in a 130 nm commercial complementary metal oxide semiconductor (CMOS) technology. These circuits can be considered as representative of the principal categories of circuits in a ULP SoC, and measured results showing the working trans-threshold prediction methodology can be evidence of test time improvement in commercial subthreshold SoCs.

Digital Combinational and Sequential Circuit

In the current experimental application embodiment, the digital circuit is a counter having D flip-flops as well as supporting combinational logic to increment the count each clock cycle. The circuit was tested from 0.3V to 0.6V, along the typical range of subthreshold SoCs. Based on these tests, a regression analysis was performed for each set of voltages, showing prediction intervals and residuals of the data to analyze the strength of the regression. The point of defined failure for this circuit was set at 50 kHz, and the corresponding points of uncertain failure were calculated for each of the remaining test voltages.

Figure 12:
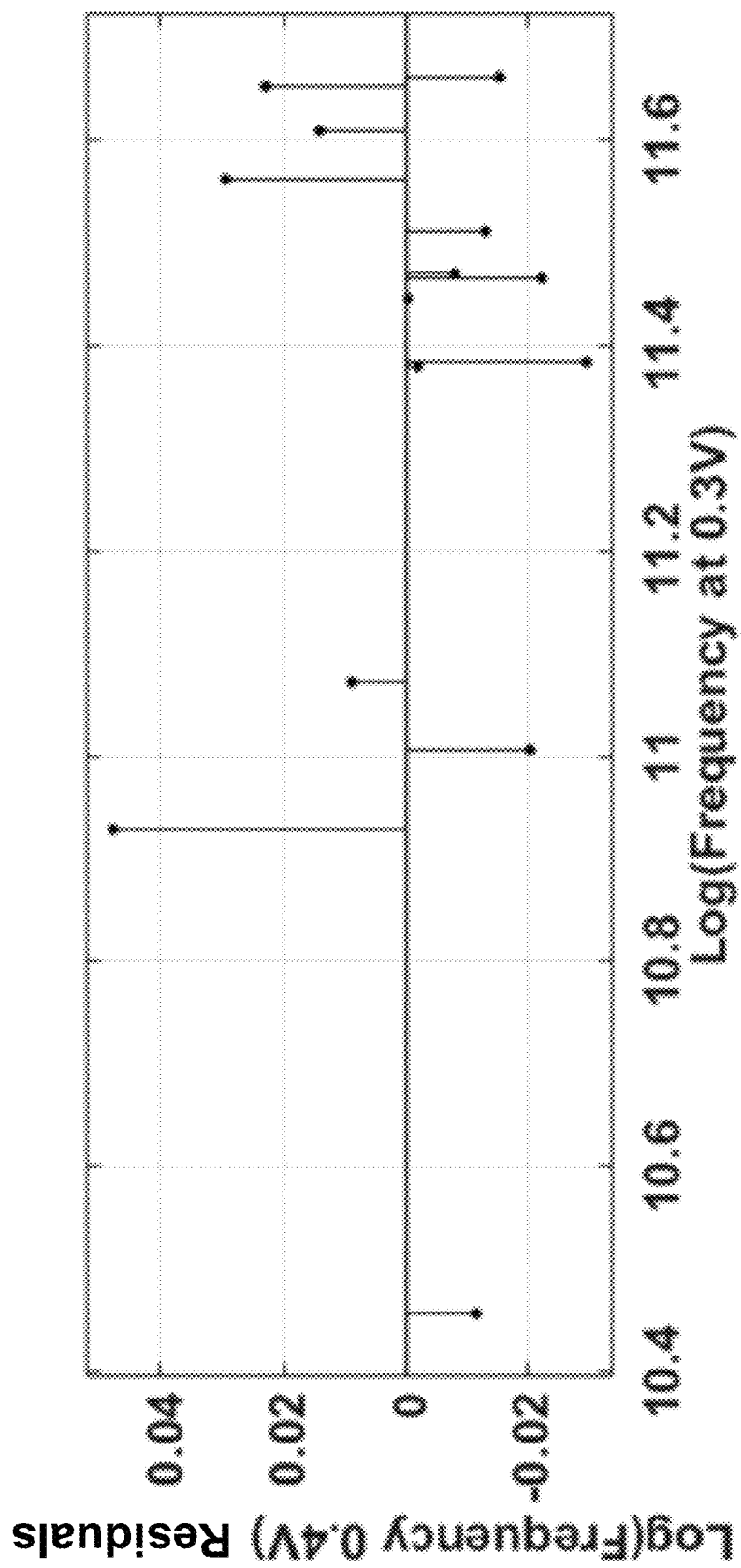
FIG. 12 shows example plot of residuals of the regression analysis performed to obtain the correlation of FIG. 11, according to some embodiment.

FIG. 11 shows a tight window of prediction due to the high correlation in delay time between 0.3V and 0.4V. Chips tested at 0.4V showing a higher delay may have to be retested at the operating voltage (0.3V) to ascertain they can pass the 50 kHz point of defined failure requirement. Residuals, shown in FIG. 12, are fairly random and do not show any obvious pattern with the exception of higher frequencies being more common. Thus, the line of best fit can be used to predict the low voltage delay of a new chip.

Figure 14:
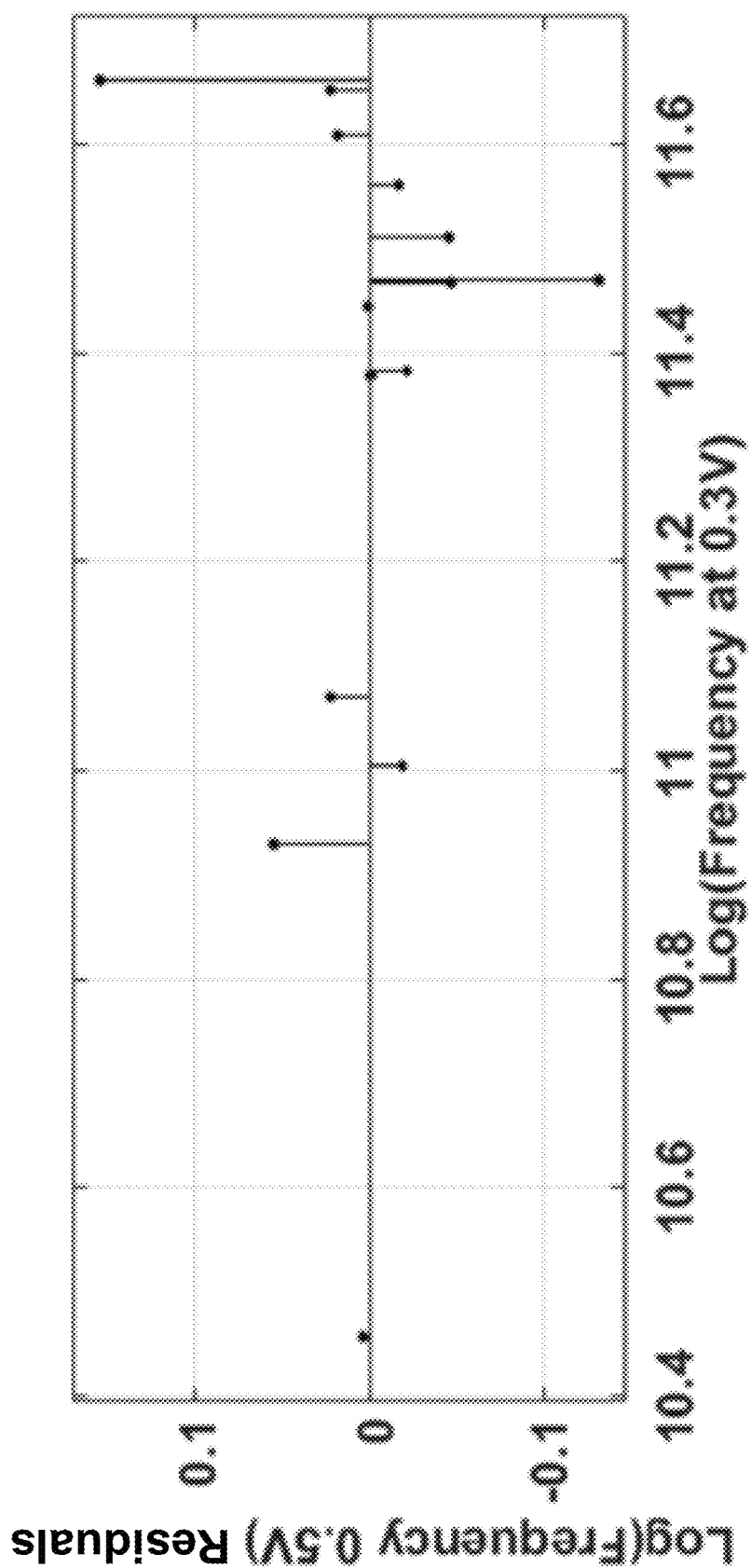
FIG. 14 shows example plot of residuals of the regression analysis performed to obtain the correlation of FIG. 13, according to some embodiment.

FIG. 13 shows an expanded window of uncertainty, as the correlations between delay weakens. The point of uncertain failure becomes much farther from the 0.3V, 50 kHz point (the point of definite failure) on the graph. Residuals, shown in FIG. 14, begin to show less randomness, as error from the mean increases with the higher frequency of operation. This is caused by some chips having an average threshold voltage at or below 0.5V, and now super-threshold effects on failure are starting to change the failure mode.

Figure 16:
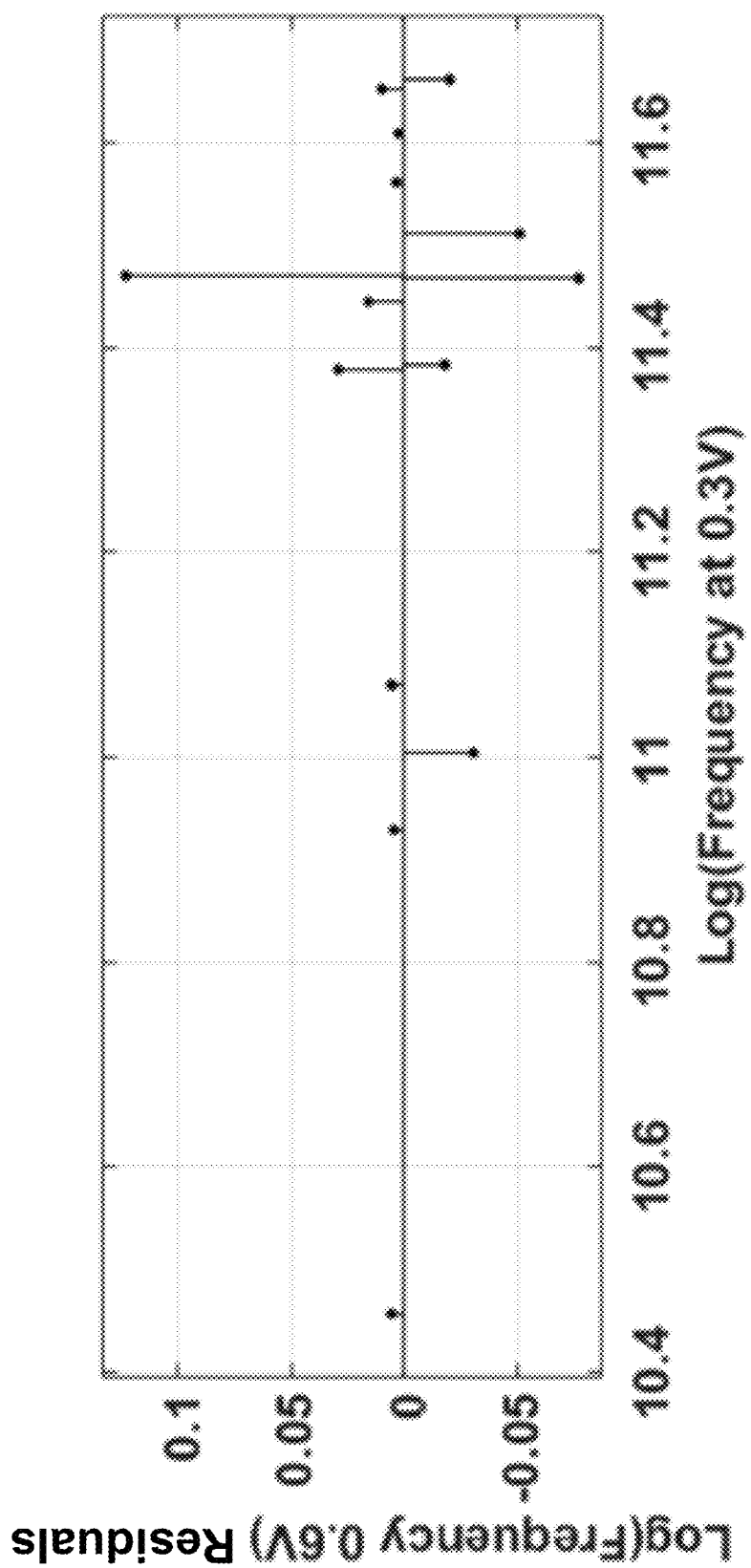
FIG. 16 shows example plot of residuals of the regression analysis performed to obtain the correlation of FIG. 15, according to some embodiment.

FIG. 15 shows an extreme window of uncertainty, almost to the point where all chips may have to be retested. The point of uncertain failure is now well beyond the average delay at 0.3V. The residuals, shown in FIG. 16, show similar patterns to the previous figure, having increased error as frequency increases, due to super-threshold effects.

Figure 17:
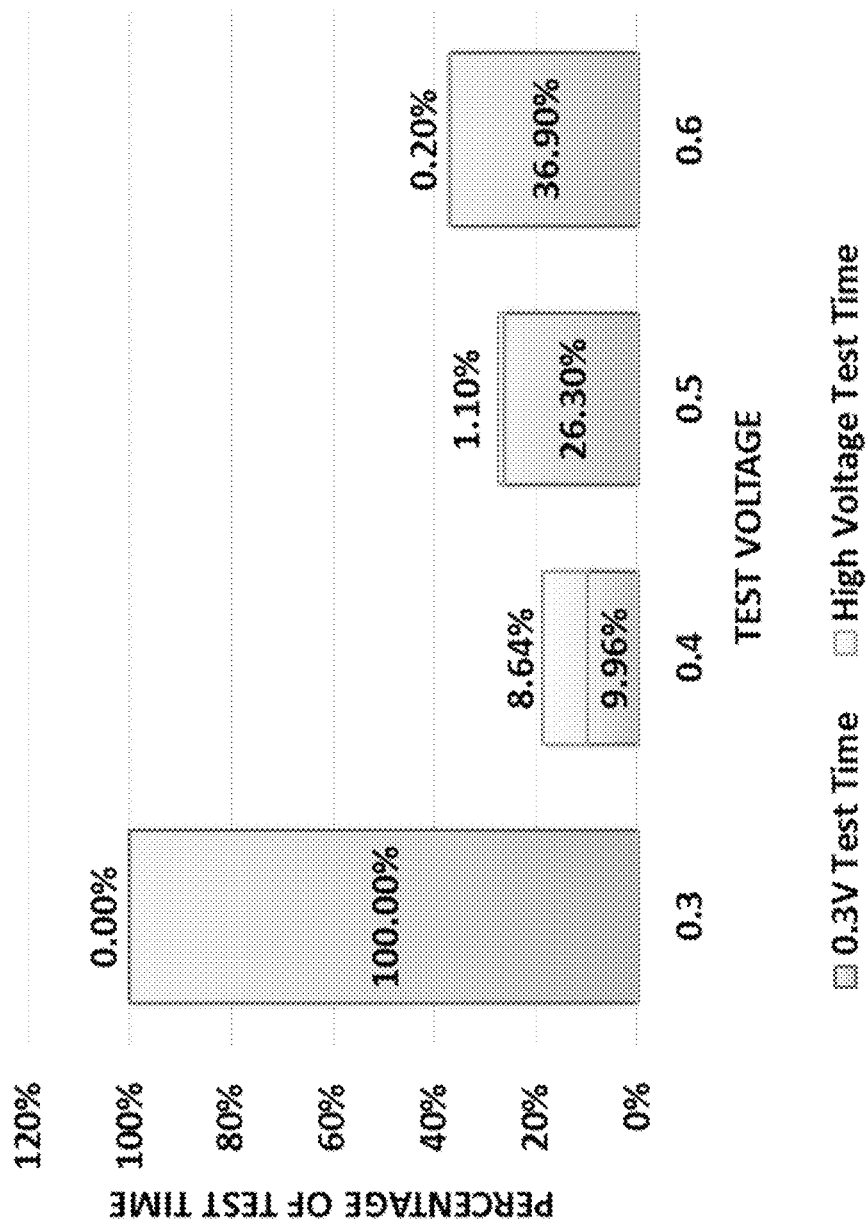
FIG. 17 shows example bar chart illustrating measured total test times for testing a digital circuit at a plurality of test voltages including a voltage near threshold or subthreshold voltages, according to some embodiment.

FIG. 17 shows the measured improvement in test time using some embodiments of the methods disclosed herein. 0.3V is the low operational voltage and the test time at that voltage is considered to take 100% of the test time. As the test voltage is increased, the number of chips that are to be retested increases but the high voltage test time reduces. For example, the time to test all chips at 0.4V accounts for about 8.64% of the test time at 0.3V. About 9.96% of the chips, however, may have to be retested at 0.4V, incurring about 9.96% of the 0.3V test time. As voltage continues to increase, retest time dominates total test time, and the benefits of the statistical analysis may no longer continue to improve test time.

Figure 18:
FIG. 18 shows example bar chart illustrating total test times for testing a digital circuit at a plurality of interpolated test voltages, according to some embodiment.

In some embodiments, the favorable or optimal (e.g., least) test time obtained after testing at a multitude of voltages may not in fact be the least test time, as other test voltages not tested can result in even lower test times. For example, in the above example, the results of which are depicted in FIG. 17, the test voltage with the least amount of test time is 0.4V. In some embodiments, interpolation of the obtained results to other test voltages (besides the tested 0.4V, 0.5V and 0.6V) may obtain an even lower test time, indicating the presence of an even more favorable or optimal testing voltage. In some embodiments, because transistor circuit delay has a first order model, the expected delay can be interpolated by fitting the model to measurements. Further, due to a clear pattern in correlation, a model can be created (or defined) to estimate $R^2$ at arbitrary voltages near those measured. Because the measured 0.4V delay showed the minimum total test time in FIG. 17, the interpolation can be performed above and below that value to find a new voltage with potentially lower test time. FIG. 18 shows test time as a result of the models created (or defined) from measurement data, which shows that the minimum modeled time, which is about 18.57% of the testing time at 0.3V, is at approximately 0.398V (i.e., 0.4V in fact is not, strictly speaking, the optimal testing voltage).

Table 1 summarizes the results of the experimental application of some embodiments of the disclosed methods on the example digital combinational and sequential circuit. The table shows the measured failure frequencies corresponding to 50 kHz at 0.3V, $R^2$ values that decrease as voltage increases, the percentage of chips that need retesting, which increases as the test voltage increases due to the increased uncertainty.

TABLE 1

| V | 0.3 Point of Uncertain Failure | $V_{High}$ Point of Uncertain Failure | $R^2$ | Logarithm of metric | Retest percentage | $V_{High}$ Improvements | Total Test Time |
|---|---|---|---|---|---|---|---|
| 0.3 | 10.82 | — | 1 | 11.32 | 0 | — | 100% |
| 0.4 | 10.89 | 13.34 | 0.9958 | 13.78 | 9.96% | 8.64% | 18.6% |

TABLE 1-continued

| V | 0.3 Point of Uncertain Failure | $V_{High}$ Point of Uncertain Failure | $R^2$ | Logarithm of metric | Retest percentage | $V_{High}$ Improvements | Total Test Time |
|---|---|---|---|---|---|---|---|
| 0.5 | 11.10 | 15.7 | 0.9457 | 15.87 | 26.3% | 1.10% | 27.4% |
| 0.6 | 11.20 | 17.29 | 0.9084 | 17.34 | 36.9% | 0.2% | 37.1% |

Memory Circuit

The previous section discussed an example application of the methods disclosed herein to digital circuits. In this section, the methods disclosed in the instant application are applied to memory circuits as a demonstration of another example experimental application. In some embodiments, SRAMs are used in subthreshold SoCs for data and instruction storage. The SRAM array referenced in this section is a 1 KB eight-transistor SRAM array with multiple low power features configured for ULP IoT applications. The address, data and read/write controls were pinned out to allow complete or nearly complete controllability and observability. The fabricated chip included the control logic, address decoders, column and row drivers and output logic. The SRAM array also used a mixture of high-threshold and nominal threshold transistors. The minimum time used to write and read a word on the array was measured and defined as the delay of the SRAM array.

Figure 19:
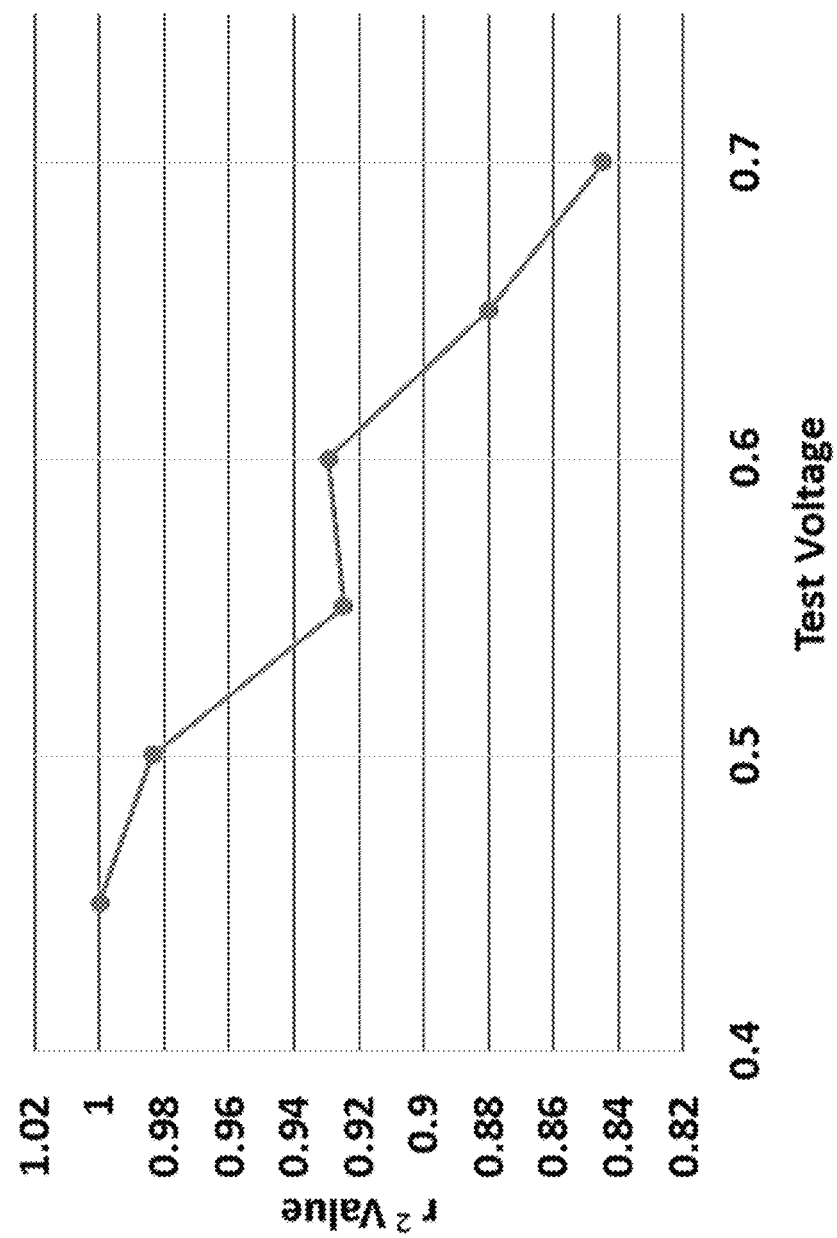
FIG. 19 is a graph that shows the correlation between delays at a lower target (e.g., subthreshold) operating voltage and delays at higher voltages as measured by the $R^2$ value of a static random access memories (SRAM) array, according to some embodiment.

To obtain the favorable or optimal (or nearly optimal) testing voltage, the delay of the array was measured at each voltage between 0.45V and 0.7V in steps of 0.05V. The target low operating voltage (e.g., the near threshold or subthreshold voltage) was defined at 0.45V and the point of defined failure at about 90 KHz. The worst-case delays for array read and write operations at each of the test voltages (i.e., from 0.5V to 0.7V in steps of 0.05V) were used to perform a regression analysis between the delay at 0.45V and each of the higher test voltages. Finally, the point of uncertain failure was determined for each of the test voltages. FIG. 19 shows the correlation between the delay (labelled "r$^2$ Value") at the low (target) operating voltage (labelled "Test Voltage") and the delay at the higher test voltages, which indicates that as the test voltage is increased, the correlation decreases resulting in a higher number of memory chips (i.e., higher proportion of the sample set) that are to be retested.

Figure 20:
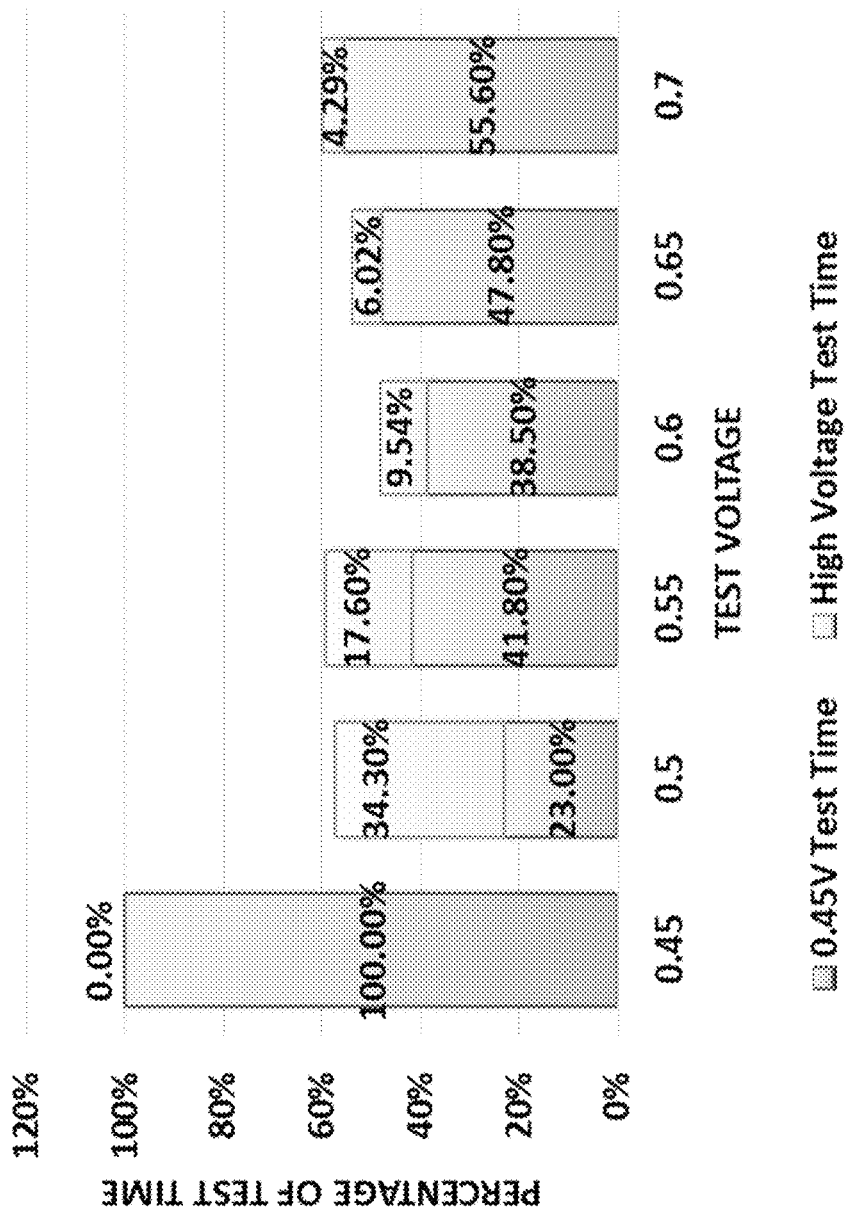
FIG. 20 shows example bar chart illustrating measured total test times for testing an SRAM array at a plurality of test voltages including a voltage near threshold or subthreshold voltages, according to some embodiment.

Based on the correlations, the test voltage with the minimal functional test time, from all the tested test voltages, is determined using the steps discussed above in great details. FIG. 20 shows the percentage test time to be used at each of the high test voltages as compared to the test time at the low operating voltage. At 0.6V, the improvements in test time are balanced against the number of chips that are to be retested resulting in a minimization of the test time for the array. Thus, testing at that voltage consumes about 48% of the test time used at 0.45V. This improvement is lower than that of the sequential logic digital circuit due to the higher operating voltage of the SRAM. Operating near the threshold voltage of the devices reduces correlation (and as a result increases retest time) because some devices are operating above their threshold while others are below. This effect is especially pronounced at 0.55V, which shows an even higher retest time than 0.6V. SRAM that can operate at a lower voltage (e.g. 0.3V) will benefit more from the proposed methodology and show similar savings to the sequential logic. Table 2 summarizes the results of the experimental application of some embodiments of the disclosed methods on the example memory circuit. The table shows the point of uncertain failures corresponding to the 90 KHz at 0.45V, the $R^2$ values, the percentage of chips that are to be retested due to the uncertainty, and the total test time to be used.

TABLE 2

| V | 0.45 Point of Uncertain Failure | $V_{High}$ Point of Uncertain Failure | $R^2$ | Logarithm of metric | Retest percentage | $V_{High}$ Improvements | Total Test Time |
|---|---|---|---|---|---|---|---|
| 0.45 | 11.44 | — | 1 | 11.93. | 0 | — | 100% |
| 0.50 | 11.6 | 12.73 | 0.9838 | 13.00 | 23% | 34.3% | 57.3% |
| 0.55 | 11.83 | 13.61 | 0.9249 | 13.67 | 41.8% | 17.6% | 59.4% |
| 0.6 | 11.8 | 14.21 | 0.9296 | 14.28 | 38.5% | 9.54% | 48.04% |
| 0.65 | 11.92 | 14.73 | 0.8799 | 14.74 | 47.8% | 6.02% | 53.82% |
| 0.7 | 12 | 15.1 | 0.845 | 15.08 | 55.6% | 4.29% | 59.89% |

Once the favorable or optimal test voltage and its corresponding point of uncertain failure are determined, the test phase can be undertaken. In some embodiments, a built-in-self-test (BIST) can be used to facilitate the test procedure, even when the SRAM does not include one. The BIST unit can run at the test voltage and the correlating test frequency. If the BIST unit indicates a success, the array is considered passing. If, however, the BIST indicates a failure, the array is be retested. For the retest, the BIST unit is run at the low operating voltage and the point of defined failure. If the BIST indicates success, the array is considered passing. Otherwise, the array is either considered defective or binned.

The above experimental applications of the disclosed methods of the present application to combinational and sequential circuits as well as SRAMs have demonstrated that the entire digital portion of a subthreshold SoC can be tested using these methods. Testing at system level can be performed by first characterizing block by block, after which each block can then be tested at its optimal test voltage. Note that the heat produced by a subthreshold SoC is low enough that they effectively operate at room temperature, meaning that few or no tests within the voltage and speed ranges discussed in the instant application would affect the temperature of the chip.

Because statistical analysis studies real-world uncertainty, certain assumptions are being made during its use. For example, sample sets used for the characterization phase are assumed to be statistically strong (i.e., contain a large enough sample set), and that some small percentage of chips may fall outside the prediction interval and falsely pass the test. This uncertainty (in a percentage of false passing chips) can be quantified and can be traded off with total test time. For example, tuning from predicted 99% bounds to a higher number could result in fewer incorrect categorizations, but would increase the test time.

The proposed approach can be used to predict delays at different temperatures to remove the need for temperature chamber testing on all chips designed for use in extreme environments and in automotive applications. With a high enough correlation, high voltage testing at room temperature can be used to predict the low voltage delay as a function of an increase or decrease in temperature.

Figure 21:
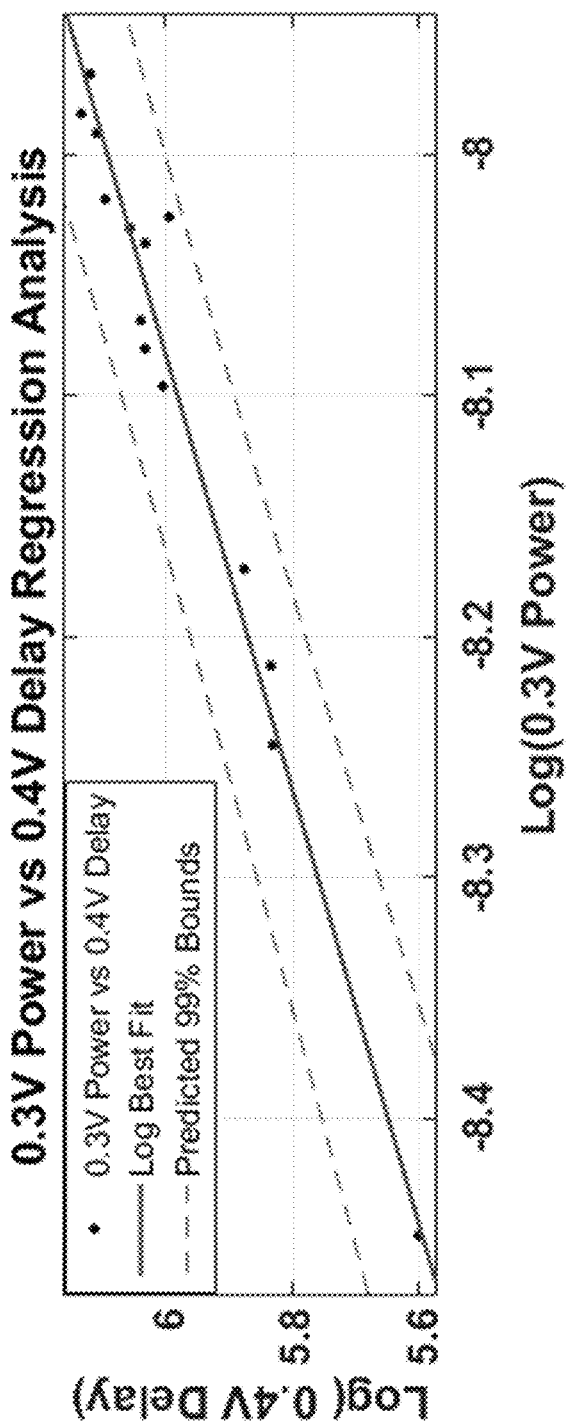
FIG. 21 is a graph that shows example correlation between power consumption values at a subthreshold operating voltage 0.3V and delay at a higher test voltage 0.4V, according to some embodiment.
Figure 22:
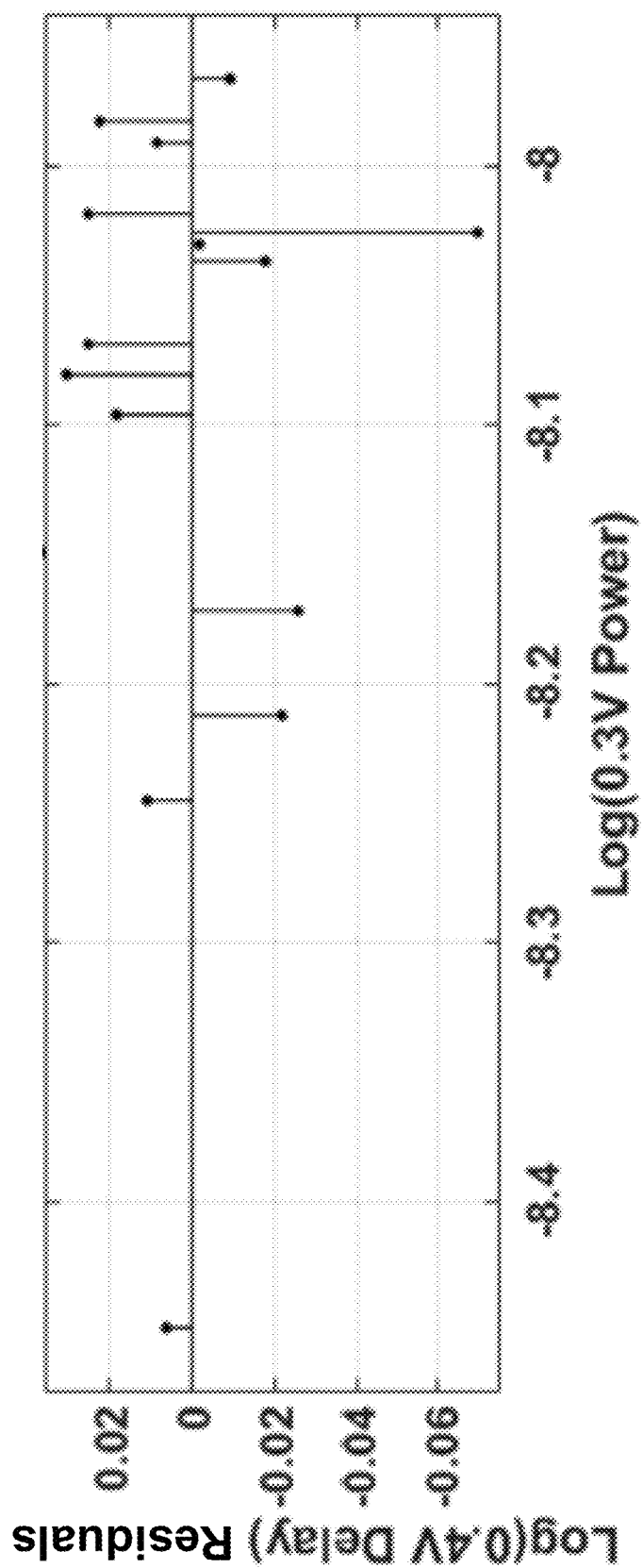
FIG. 22 shows example plot of residuals of the regression analysis performed to obtain the correlation of FIG. 21, according to some embodiment.

In some embodiments, the methods disclosed herein can also be applied to predict metrics other than delay. For example, FIG. 21 shows the measured correlation between the delay at high test voltages and the power consumption at the low operational voltage of the digital combinational circuit. By measuring power consumption during characterization at each voltage, a model of the correlation between delay and power can be created. This model can then give insight on the power consumption of the chip at the low operational voltage during the high voltage tests with little or no additional test time.

While various embodiments have been described above, it should be understood that they have been presented by way of example only, and not of limitation. Likewise, the various diagrams may depict an example architectural or other configuration for the embodiments, which is done to aid in understanding the features and functionality that can be included. The disclosure is not restricted to the illustrated example architectures or configurations, but can be implemented using a variety of alternative architectures and configurations. Additionally, it should be understood that the various features and functionality described in one or more of the individual embodiments are not limited in their applicability to the particular embodiment with which they are described, but instead can be applied, alone or in some combination, to one or more of the other embodiments, whether or not such embodiments are described and whether or not such features are presented as being a part of a described embodiment. Thus the breadth and scope of the disclosure should not be limited by any of the above-described exemplary embodiments.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors.

The invention claimed is:

1. A method, comprising:
   testing a chip for fault at a favorable operating voltage, the testing including measuring a metric characterizing the fault at the favorable operating voltage to obtain a first metric value; and
   re-testing the chip for the fault at a first operating voltage upon the first metric value at the favorable operating voltage being correlated, according to a metric correlation establishing a correlation relationship between the favorable operating voltage and the first operating voltage, to a second metric value at the first operating voltage within a predictive interval of the metric correlation,
   the first operating voltage being (1) less than the favorable operating voltage, and (2) at a sub-threshold voltage or substantially at a threshold voltage of a transistor of the chip; and
   the second metric value being a maximum or a minimum of metric values at the first operating voltage indicating absence of the fault in the chip.

2. The method of claim 1, wherein the favorable operating voltage is configured such that a total time to test a statistically large number of chips for the fault at the favorable operating voltage is less than the total testing time at any other operating voltage within a predefined range including the favorable operating voltage.

3. The method of claim 1, wherein the fault is a delay fault and the metric related to the fault is a maximum operating frequency of the chip.

4. The method of claim 1, wherein:
   the fault is a delay fault,
   the metric related to the fault is a maximum operating frequency of the chip, and
   the first metric value at the first operating voltage is an upper limit of metric values at the first operating voltage that indicate presence of delay fault in the chip.

5. The method of claim 1, wherein $R^2$ value of the metric correlation exceeds a minimum correlation threshold.

6. The method of claim 1, wherein the chip includes a memory circuit.

7. A method, comprising:
   determining a favorable operating voltage to test a chip for fault characterized by a metric;
   establishing a metric correlation between a first operating voltage and the favorable operating voltage, the first operating voltage being (1) less than the favorable operating voltage, and (2) at a sub-threshold voltage or substantially at a threshold voltage of a transistor of the chip;
   identifying a first metric value at the first operating voltage that is an upper limit or a lower limit of metric values at the first operating voltage that indicate absence of the fault in the chip;
   testing the chip for the fault at the favorable operating voltage, the testing including measuring the metric at the favorable operating voltage to obtain a second metric value; and
   re-testing the chip for the fault at the first operating voltage upon the second metric value at the favorable operating voltage being correlated within a predictive interval of the metric correlation to the first metric value at the first operating voltage according to the metric correlation.

8. The method of claim 7, further comprising:
   classifying the chip as faulty when:
   (1) the second metric value fails to correlate within a predictive interval of the metric correlation with the first metric value, and
   (2) metric values at the first operating voltage that correlate with the second metric value are less than the first metric value when the first metric value is the upper limit of the metric values, or metric values at the first operating voltage that correlate with the second metric value are greater than the first metric value when the first metric value is the lower limit of the metric values.

9. The method of claim 7, further comprising:
classifying the chip as fault-free when:
(1) the second metric value fails to correlate within a predictive interval of the metric correlation with the first metric value, and
(2) metric values at the first operating voltage that correlate with the second metric value are greater than the first metric value when the first metric value is the upper limit of the metric values, or metric values at the first operating voltage that correlate with the second metric value are less than the first metric value when the first metric value is the lower limit of the metric values.

10. The method of claim 7, wherein the favorable operating voltage is configured such that a total time for testing a statistically large number of chips for the fault at the favorable operating voltage is less than the total testing time at any other operating voltage within a predefined range of the favorable operating voltage.

11. The method of claim 7, wherein the fault is a delay fault, the metric related to the fault is a maximum operating frequency of the chip and the first metric value at the first operating voltage is an upper limit of metric values at the first operating voltage that indicate presence of delay fault in the chip.

12. The method of claim 7, wherein $R^2$ value of the metric correlation exceeds a minimum correlation threshold.

13. The method of claim 7, wherein the chip includes a memory circuit.

14. A method, comprising:
(A) testing each chip of a plurality of chips in a sample set for a fault, the testing including measuring a metric related to the fault at (1) a first operating voltage at a sub-threshold voltage or substantially at a threshold voltage of a transistor of the chip, and (2) a second operating voltage of a plurality of operating voltages higher than the first operating voltage,
a size of the sample set being no smaller than a minimum sample size of a statistically representative sample of chips for a population of chips to be tested for the fault;
(B) establishing, based on a plurality of metric values at the first operating voltage and a plurality of metric values at the second operating voltage obtained from the metric measurement, a metric correlation between the metric at the first operating voltage and the metric at the second operating voltage;
(C) determining, based on the metric correlation, a proportion of chips in the sample set with a second metric value of the plurality of metric values at the second operating voltage that are correlated within a predictive interval of the metric correlation with a first metric value of the plurality of metric values at the first operating voltage,
the first metric value at the first operating voltage being a maximum or a minimum of metric values indicating absence of the fault in a chip of the large population of chips;
(D) obtaining a total test time at the second operating voltage based on:
a first total time for testing all chips in the sample set at the first operating voltage and,
a second total time for (1) testing all chips in the sample set at the second operating voltage and (2) testing the determined proportion of chips at the first operating voltage;
(E) repeating (A), (B), (C) and (D) for each operating voltage of the plurality of operating voltages to obtain a plurality of total test times at respective operating voltages of the plurality of operating voltages; and
(F) identifying a favorable operating voltage for testing the large population of chips based at least in part on the plurality of total test times.

15. The method of claim 14, wherein the size of the sample set is obtained based on a statistical power analysis.

16. The method of claim 14, wherein establishing the metric correlation includes calculating, for the second operating voltage, an upper bound and/or a lower bound of a prediction interval of the metric correlation.

17. The method of claim 14, wherein determining the proportion of chips includes:
calculating, for the second operating voltage, an upper bound of a prediction interval of the metric correlation;
identifying, from values of the upper bound of the prediction interval, a first upper bound value corresponding to the first metric value; and
calculating a z-score of the first upper bound value using the plurality of metric values at the second operating voltage.

18. The method of claim 14, wherein the total test time includes a difference between the first total time and the second total time.

19. The method of claim 14, wherein:
the total test time is a difference between the first total time and the second total time; and
identifying the favorable operating voltage includes identifying an operating voltage from the plurality of operating voltages with a largest total test time.

20. The method of claim 14, wherein identifying the favorable operating voltage includes:
extrapolating the first total time and the second total time to at least one operating voltage between the first operating voltage and a maximum of the plurality of operating voltages, the at least one operating voltage being different from the first operating voltage and all operating voltages of the plurality of operating voltages; and
identifying the at least one operating voltage as the favorable operating voltage upon a difference between the extrapolated first total time and second total time exceeding a difference between the first total time and the second total time.

* * * * *